US008268953B2

(12) United States Patent
Oda et al.

(10) Patent No.: US 8,268,953 B2
(45) Date of Patent: Sep. 18, 2012

(54) POLYCARBONATE CONTAINING PLANT-DERIVED COMPONENT AND PROCESS FOR THE PREPARATION THEREOF

(75) Inventors: Akimichi Oda, Iwakuni (JP); Eiichi Kitazono, Iwakuni (JP); Ryuji Nonokawa, Iwakuni (JP); Takanori Miyoshi, Iwakuni (JP)

(73) Assignee: Teijin Limited, Osaka (JP)

( * ) Notice: Subject to any disclaimer, the term of this patent is extended or adjusted under 35 U.S.C. 154(b) by 256 days.

(21) Appl. No.: 12/681,555

(22) PCT Filed: Sep. 30, 2008

(86) PCT No.: PCT/JP2008/068131
§ 371 (c)(1),
(2), (4) Date: Apr. 2, 2010

(87) PCT Pub. No.: WO2009/044907
PCT Pub. Date: Apr. 9, 2009

(65) Prior Publication Data
US 2010/0216914 A1    Aug. 26, 2010

(30) Foreign Application Priority Data

| Oct. 4, 2007 | (JP) | 2007-260969 |
| Oct. 5, 2007 | (JP) | 2007-262048 |
| Oct. 5, 2007 | (JP) | 2007-262049 |
| Nov. 28, 2007 | (JP) | 2007-307264 |
| Apr. 4, 2008 | (JP) | 2008-098253 |
| Jun. 5, 2008 | (JP) | 2008-147969 |

(51) Int. Cl.
*C08G 64/00* (2006.01)
*C08G 63/02* (2006.01)
(52) U.S. Cl. ............ 528/196; 524/9; 527/300; 527/310; 528/198
(58) Field of Classification Search ...... 524/9; 527/300, 527/310
See application file for complete search history.

(56) References Cited

U.S. PATENT DOCUMENTS

| 4,506,066 A | 3/1985 | Medem et al. |
| 6,410,678 B1 | 6/2002 | Ishida et al. |
| 2003/0097028 A1 | 5/2003 | Fuertes |
| 2006/0069228 A1 | 3/2006 | McCloskey et al. |
| 2006/0149024 A1 | 7/2006 | Ono et al. |

FOREIGN PATENT DOCUMENTS

| EP | 1 149 852 A1 | 10/2001 |
| GB | 1079686 | 8/1967 |
| JP | 2-175722 A | 7/1990 |
| JP | 2002-534486 A | 10/2002 |
| JP | 2003-226751 A | 8/2003 |
| JP | 2003-292603 A | 10/2003 |
| JP | 2005-232093 A | 9/2005 |
| JP | 2006-028441 A | 2/2006 |
| JP | 2008-514754 A | 5/2008 |
| WO | 00/41985 A1 | 7/2000 |
| WO | 01/40352 A1 | 6/2001 |
| WO | 03/043959 A1 | 5/2003 |
| WO | 2004/111106 A1 | 12/2004 |
| WO | 2006/036545 A1 | 4/2006 |
| WO | 2007/013463 A1 | 2/2007 |
| WO | 2007/148604 A1 | 12/2007 |
| WO | 2008/093860 A1 | 8/2008 |

OTHER PUBLICATIONS

Department of Plastic Materials, Polycarbonate Resin, Sep. 30, 1969, Nikkan Kogyo Shimbun.

*Primary Examiner* — Terressa Boykin
(74) *Attorney, Agent, or Firm* — Sughrue Mion, PLLC

(57) ABSTRACT

A process for the preparation of a polycarbonate containing a plant-derived component excellent in hue by using a plant-derived anhydrosugar alcohol represented by the following formula (1) or a composition thereof as a raw material:

(1)

wherein $R^1$ to $R^4$ each independently represent a group selected from a hydrogen atom, an alkyl group, a cycloalkyl group and an aryl group.

6 Claims, No Drawings

POLYCARBONATE CONTAINING PLANT-DERIVED COMPONENT AND PROCESS FOR THE PREPARATION THEREOF

TECHNICAL FIELD

The present invention relates to a polycarbonate containing a plant-derived component that is improved in hue, a molded article containing the polycarbonate, and a process for the preparation of the polycarbonate.

BACKGROUND ART

A polycarbonate resin is excellent in transparency, heat resistance and impact resistance, and is widely used in an optical medium field, an electric, electronic and office automation filed, an automobile and industrial machinery field, a medical field, and other various industrial fields. An aromatic polycarbonate, which is ordinarily used currently, is produced from raw materials obtained from petroleum resources. Accordingly, in view of the existing situations of concern, e.g., exhaustion of petroleum and global warming due to carbon dioxide generated on incineration of waste products, such a material is expected that has properties equivalent to an aromatic polycarbonate but involves reduced environmental load.

Under the circumstances, a dianhydrohexitol compound (such as isomannide, isoidide and isosorbide), which is an anhydrosugar alcohol, can be derived from a plant-derived raw material, such as mannitol, iditol and sorbitol, and is being studied as a regenerable resource (i.e., a resource that differs from exhaustible natural resources such as petroleum and coal but has a regeneration capability by itself, such as forest resources, biomass, wind power and small-scale hydroelectric power generation) for producing a polymer, particularly polyester and polycarbonate. In particular, a polymer produced with isosorbide, which is produced from inexpensive starch and is easily available commercially since it is used as a medical raw material, has been earnestly investigated (see, for example, Patent Documents 1 to 3).

Furthermore, a carbonate obtained by copolymerizing, as a diol component, a glycol compound or the like used as a polyester raw material, in addition to isosorbide, is being studied (see, for example, Patent Documents 4 and 5). This is because a polycarbonate containing only isosorbide as a diol component involves such problems as difficulty in molding due to the considerably high melt viscosity thereof derived from the rigid structure. A dianhydrohexitol compound is significantly expensive as a raw material for a polymer, which brings about a problem in cost. In other words, the cost for raw materials can be advantageously reduced by copolymerizing an inexpensive glycol compound in such a range that the necessary polymer properties can be maintained.

Apart from the matters, the most notable problem appearing in the conventional investigations is that a polymer produced with an anhydrosugar alcohol, such as isosorbide, is inferior in hue as compared to an ordinary polymer produced with a petroleum raw material, and thus there are difficulties on commercialization and spread of usage of the polymer thereby.

It has been known that an anhydrosugar alcohol compound is decomposed or denatured under some storage conditions, and various studies have been made for improving the stability thereof. For example, Patent Document 6 discloses that a particular reducing agent or antioxidant, such as sodium boron hydride, is added as a stability improving agent at a particular timing in the production process of an anhydrosugar alcohol, thereby improving the stability thereof on storing at 40° C.

Patent Document 1
British Patent No. 1,079,686
Patent Document 2
U.S. Pat. No. 4,506,066
Patent Document 3
WO 2007/013463
Patent Document 4
WO 2004/111106
Patent Document 5
JP-A-2003-292603
Patent Document 6
WO 2003/043959 (US-A 2003/0097028 and JP-T-2005-509667)

DISCLOSURE OF THE INVENTION

An object of the invention is to provide a polycarbonate containing a plant-derived component that is excellent in hue, a molded article containing the polycarbonate, and a process for the preparation of the polycarbonate. In the following description, the term "polymer" means the polycarbonate containing a plant-derived component unless otherwise indicated.

Means for Solving the Problems

The inventors have made earnest investigations for attaining the object and have completed the invention. Some aspects encompassed by the invention will be described below.

I. The following inventions 1 and 2 are provided for attaining the object.

1. A process for the preparation of a polycarbonate represented by the following formula (5):

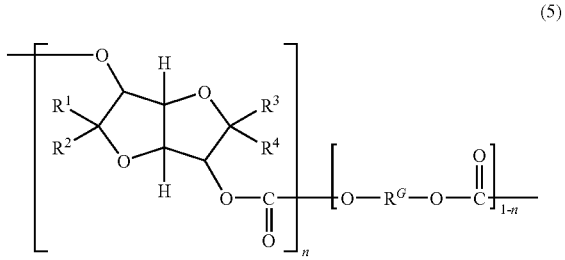

(5)

wherein $R^1$ to $R^4$ each independently represent a group selected from a hydrogen atom, an alkyl group, a cycloalkyl group and an aryl group; $R^G$ represents an aliphatic group having from 2 to 12 carbon atoms; and n represents 1 or $0.6 \leq n \leq 0.9$, the process containing a step of melt-polycondensing an anhydrosugar alcohol component containing 100 parts by mass of an anhydrosugar alcohol represented by the following formula (1) having a total content of Na, Fe and Ca of 2 ppm by mass or less and a purity of 99.7% by mol or more analyzed by gas chromatography:

3

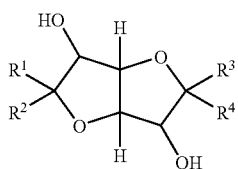

(1)

wherein R¹ to R⁴ each independently represent a group selected from a hydrogen atom, an alkyl group, a cycloalkyl group and an aryl group, and from 0.0005 to 0.5 part by mass of a cyclic phosphite compound represented by the following formula (2):

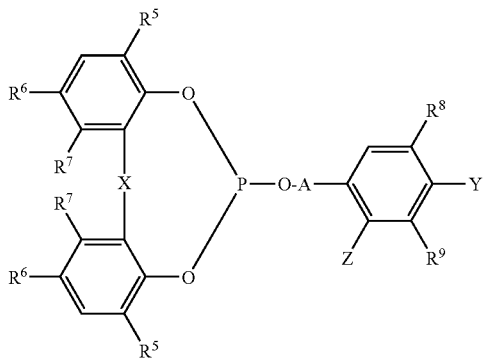

(2)

wherein $R^5$, $R^6$, $R^8$ and $R^9$ each independently represent a hydrogen atom, an alkyl group having from 1 to 8 carbon atoms, a cycloalkyl group having from 5 to 8 carbon atoms, an alkylcycloalkyl group having from 6 to 12 carbon atoms, an aralkyl group having from 7 to 12 carbon atoms or a phenyl group; $R^7$ represents a hydrogen atom or an alkyl group having from 1 to 8 carbon atoms; X represents a single bond, a sulfur atom or a —$CHR^{10}$— group (wherein $R^{10}$ represents a hydrogen atom, an alkyl group having from 1 to 8 carbon atoms or a cycloalkyl group having from 5 to 8 carbon atoms); A represents an alkylene group having from 2 to 8 carbon atoms or *—$COR^{11}$— group (wherein $R^{11}$ represents a single bond or an alkylene group having from 1 to 8 carbon atoms, and the bond indicated with * is connected to the oxygen atom); one of Y and Z represents a hydroxyl group, an alkoxy group having from 1 to 8 carbon atoms or an aralkyloxy group having from 7 to 12 carbon atoms, and the other thereof represents a hydrogen atom or an alkyl group having from 1 to 8 carbon atoms; provided that when Y represents a hydroxyl group, one of $R^8$ and $R^9$ represents an alkyl group having from 3 to 8 carbon atoms, a cycloalkyl group having from 5 to 8 carbon atoms, an alkylcycloalkyl group having from 6 to 12 carbon atoms, an aralkyl group having from 7 to 12 carbon atoms or a phenyl group; and two groups represented by $R^5$ in the formula (2) may be the same as or different from each other, two groups represented by $R^6$ in the formula (1) may be the same as or different from each other, and two groups represented by $R^7$ in the formula (2) may be the same as or different from each other, with a diol represented by the following formula (3) having a total content of Na, Fe and Ca of 2 ppm by mass or less and a purity of 99.7% by mol or more analyzed by gas chromatography as a diol component:

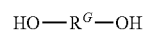

(3)

wherein $R^G$ represents an aliphatic group having from 2 to 12 carbon atoms, using a carbonate diester represented by the following formula (4) having a total content of Na, Fe and Ca of 2 ppm by mass or less and a purity of 99.7% by mol or more analyzed by gas chromatography:

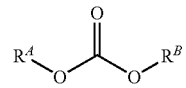

(4)

wherein $R^A$ and $R^B$ each represent a group selected from an alkyl group, a cycloalkyl group and an aryl group, provided that $R^A$ and $R^B$ may be the same as or different from each other, in the presence of a metallic element selected from the following (a) and (b), (a) one or more kind of a metallic element selected from an alkali metal, magnesium, calcium and strontium in an amount of from 1.2 to 40 μmol per 1 mol of a total diol component including the anhydrosugar alcohol represented by the formula (1) and the diol represented by the formula (3) and from 0.015 to 3.0 mol per 1 mol of the cyclic phosphite compound represented by the formula (2), and (b) a barium element in an amount of from 1.2 to 40 μmol per 1 mol of a total diol component including the anhydrosugar alcohol represented by the formula (1) and the diol represented by the formula (3) and from 0.005 to 3.0 mol per 1 mol of the cyclic phosphite compound represented by the formula (2), and one or more kind of a metallic element selected from an alkali metal, magnesium, calcium and strontium in an amount of 40 μmol or less in terms of a total amount with the barium element per 1 mol of anhydrosugar alcohol represented by the formula (1) and 3 mol or less in terms of a total amount with the barium element per 1 mol of the cyclic phosphite compound represented by the formula (2).

2. A polycarbonate prepared by the process according to the item 1 and having a specific viscosity (measured at 20° C. as a solution having 0.7 g of the polycarbonate dissolved in 100 mL of methylene chloride) of from 0.20 to 0.45 and a Col-b value of 5 or less.

II. The following inventions 3 to 7 are provided for attaining the object.

3. A process for the preparation of a polycarbonate containing a plant-derived component represented by the following formula (6):

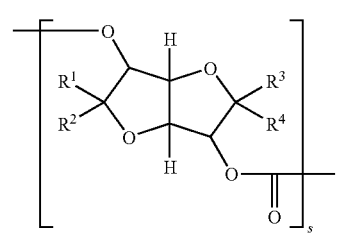

(6)

wherein R¹ to R⁴ each independently represent a group selected from a hydrogen atom, an alkyl group, a cycloalkyl group and an aryl group; and s represents an integer of from 10 to 10,000 in terms of a number of repeating units, the process containing a step of melt-polycondensing an anhydrosugar alcohol represented by the following formula (1):

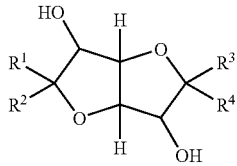
(1)

wherein $R^1$ to $R^4$ each independently represent a group selected from a hydrogen atom, an alkyl group, a cycloalkyl group and an aryl group, and a carbonate diester represented by the following formula (4):

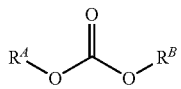
(4)

wherein $R^A$ and $R^B$ each represent a group selected from an alkyl group, a cycloalkyl group and an aryl group, provided that $R^A$ and $R^B$ may be the same as or different from each other, in the presence of a nitrogen-containing basic compound in an amount of from 50 to 500 μmol and an alkali metal element and an alkaline earth metal element in a total amount of from 1.2 to 40 μmol, per 1 mol of the anhydrosugar alcohol represented by the formula (1).

4. The process for the preparation of a polycarbonate according to the item 4, wherein the alkali metal element and the alkaline earth metal element are at least one metallic element selected from the group consisting of lithium, sodium, potassium, calcium and barium.

5. The process for the preparation of a polycarbonate according to the item 3 or 4, wherein the nitrogen-containing basic compound is tetramethylammonium hydroxide.

6. The process for the preparation of a polycarbonate according to one of the items 3 to 5, wherein the anhydrosugar alcohol represented by the formula (1) described in the item 3 has a total content of Na, Fe and Ca of 2 ppm by mass or less and a purity of 99.7% by mol or more analyzed by gas chromatography, and the carbonate diester represented by the formula (4) described in the item 3 has a total content of Na, Fe and Ca of 2 ppm by mass or less and a purity of 99.7% by mol or more analyzed by gas chromatography.

7. A polycarbonate prepared by the process according to one of the items 3 to 6 and having a specific viscosity (measured at 20° C. as a solution having 0.7 g of the polycarbonate dissolved in 100 mL of methylene chloride) of from 0.22 to 0.34 and a Col-b value of 5 or less.

III. The following inventions 8 and 9 are provided for attaining the object.

8. A process for the preparation of a polycarbonate represented by the following formula (5):

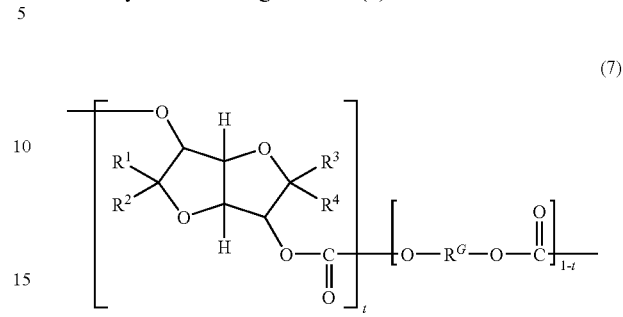
(7)

wherein $R^1$ to $R^4$ each independently represent a group selected from a hydrogen atom, an alkyl group, a cycloalkyl group and an aryl group; $R^G$ represents an aliphatic group having from 2 to 12 carbon atoms; and t represents $0.4 \leq t \leq 1$, the process containing a step of melt-polycondensing a diol component containing an anhydrosugar alcohol represented by the following formula (1) having a total content of Na, Ca and Fe of 2 ppm by mass or less:

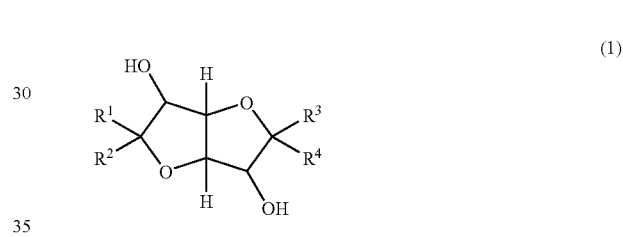
(1)

wherein $R^1$ to $R^4$ each independently represent a group selected from a hydrogen atom, an alkyl group, a cycloalkyl group and an aryl group, and a diol represented by the following formula (3) having a total content of Na, Ca and Fe of 2 ppm by mass or less:

(3)

wherein $R^G$ represents an aliphatic group having from 2 to 12 carbon atoms, with a carbonate component containing a carbonate diester represented by the following formula (4) having a total content of Na, Ca and Fe of 2 ppm by mass or less:

(4)

wherein $R^A$ and $R^B$ each represent a group selected from an alkyl group, a cycloalkyl group and an aryl group, provided that $R^A$ and $R^B$ may be the same as or different from each other, in the presence of a barium compound as a polycondensation catalyst.

9. A polycarbonate prepared by the process according to the item 8 and having a total content of Na, Ca and Fe of 10 ppm by mass or less and a Col-b value of 5 or less.

IV. The following inventions 10 to 13 are provided for attaining the object.

10. A polycarbonate represented by the following formula (5) having a total content of F, Cl, Br and I in the polymer of 2 ppm by mass or less:

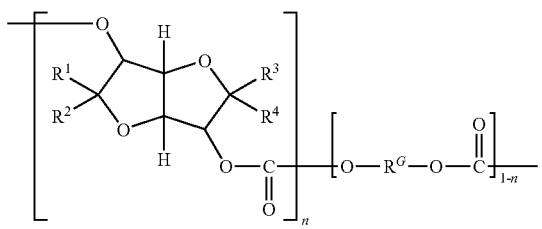

wherein $R^1$ to $R^4$ each independently represent a group selected from a hydrogen atom, an alkyl group, a cycloalkyl group and an aryl group; $R^G$ represents an aliphatic group having from 2 to 12 carbon atoms; and n represents 1 or $0.6 \leq n \leq 0.9$.

11. The polycarbonate according to the item 10, wherein the polycarbonate has a Col-b value of 5 or less.

12. A molded article containing the polycarbonate according to the item 10 or 11.

13. A process for the preparation of the polycarbonate according to the item 10 or 11, the process containing a step of melt-polycondensing an anhydrosugar alcohol represented by the following formula (1) having a total content of F, Cl, Br and I of 1.5 ppm by mass or less and a purity of 99.7% by mol or more analyzed by gas chromatography:

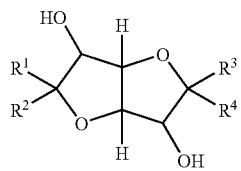

wherein $R^1$ to $R^4$ each independently represent a group selected from a hydrogen atom, an alkyl group, a cycloalkyl group and an aryl group, a diol represented by the following formula (3) having a total content of F, Cl, Br and I of 1.5 ppm by mass or less and a purity of 99.7% by mol or more analyzed by gas chromatography:

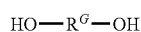

wherein $R^G$ represents an aliphatic group having from 2 to 12 carbon atoms, and a carbonate diester represented by the following formula (4) having a total content of F, Cl, Br and I of 1.5 ppm by mass or less and a purity of 99.7% by mol or more analyzed by gas chromatography:

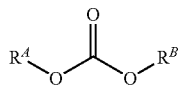

wherein $R^A$ and $R^B$ each represent a group selected from an alkyl group, a cycloalkyl group and an aryl group, provided that $R^A$ and $R^B$ may be the same as or different from each other.

Advantages of the Invention

According to the invention, a polycarbonate containing a plant-derived component that is excellent in hue, a molded article containing the polycarbonate, and a process for the preparation of the polycarbonate are provided.

The polycarbonate according to the invention contains a plant-derived component as a regenerable resource, involves reduced environmental load, and is excellent in hue, and thus the polycarbonate is considerably useful for various purposes.

BEST MODE FOR CARRYING OUT THE INVENTION

The invention will be described in detail below.

The raw materials including the anhydrosugar alcohol and the like, the polycondensation method, the polycondensation catalyst, and the properties of the polycarbonate, which are commonly applied to the inventions 1 to 13, will be described.

The anhydrosugar alcohol represented by the formula (1) used in the invention is specifically a dianhydrohexitol compound (which may be sometimes referred to as an etherdiol). Examples of the dianhydrohexitol compound include isomannide, isoidide and isosorbide, which are represented by the following formulae (8), (9) and (10), respectively.

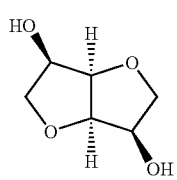

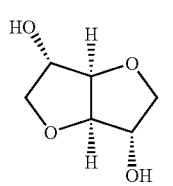

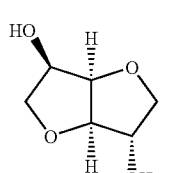

The dianhydrohexitol compound is a substance that is obtained from biomass of natural substances and is referred to as a regenerable resource. In particular, isosorbide is an anhydrosugar alcohol compound that can be easily produced from starch or the like and is available abundantly as resources and is advantageous in production over isomannide and isoidide.

However, a commercially available product of the anhydrosugar alcohol represented by the formula (1) may contain a stabilizer or a deteriorated product formed upon storing, which may adversely affect the quality of the resulting polymer, and therefore, it is preferred to purify the anhydrosugar alcohol again before subjecting to polymerization reaction for providing the polymer.

It has been known that the anhydrosugar alcohol represented by the formula (1) may be decomposed or denatured under some storage conditions, and in the case where the compound is used after storing for a certain period by necessity, it is preferred that the compound used is stored under a dry, low temperature (40° C. or less), light shielding and inert atmosphere.

Furthermore, for suppressing the anhydrosugar alcohol represented by the formula (1) from being decomposed and denatured, it is particularly preferred that the anhydrosugar alcohol is used as a composition with the cyclic phosphite compound represented by the formula (2) as a stabilizer, as referred in the items 1 and 2.

The diol component to be copolymerized is represented by the formula (3) (hereinafter, the diol represented by the formula (3) may be sometimes referred to as a glycol compound), and examples thereof include ethylene glycol, propylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, 1,4-cyclohexanedimethanol and neopentyl glycol. Among these, 1,3-propanediol (which may be hereinafter abbreviated as 1,3-PDO), 1,4-butanediol (which may be hereinafter abbreviated as 1,4-BDO) and 1,6-hexanediol (which may be hereinafter abbreviated as 1,6-HDO) are preferred since they have high polymerizing capability during the synthesis of the polymer and provide a polymer exhibiting a high glass transition temperature, and 1,3-propanediol is particularly preferred since it can be obtained from a plant-derived material and exhibits significant improvement in flowability through copolymerization. Two or more kinds of the diol component represented by the formula (3) may be used in combination.

The purification method of the diol used in the invention is not particularly limited, and preferably, one of combination of simple distillation, rectification and recrystallization may be used for purification.

A polycarbonate may be prepared as a homopolymer by polycondensation reaction without the diol represented by the formula (3). The homopolymer may be inferior in moldability but is advantageous in industrial production since the number of kinds of the materials used is small by one. The homopolymer may be preferred since a polymer having a significantly high glass transition temperature may be obtained in some cases.

The anhydrosugar alcohol represented by the formula (1) and the diol component represented by the formula (3) (both of which may be hereinafter referred to as a total diol component) have a content of an organic impurity detected by gas chromatography of 0.3% by mol or less, preferably 0.1% by mol or less, and further preferably 0.05% by mol or less, based on the total amount. In consideration of the purification cost and the technical limitation, the lower limit of the content of an organic impurity that can be ensured in an industrial scale is generally about 0.01% by mol.

The diol components represented by the formulae (1) and (3) used in the invention have a total content of Na, Fe and Ca detected by ICP optical emission spectrometry of 2 ppm by mass or less, and preferably 1 ppm by mass or less.

The carbonate diester used in the invention is represented by the formula (4), and examples thereof include an aromatic carbonate diester, such as diphenyl carbonate, ditolyl carbonate, dixylyl carbonate, bis(ethylphenyl)carbonate, bis(methoxyphenyl)carbonate, bis(ethoxyphenyl)carbonate, bis(chlorophenyl)carbonate, dinaphthyl carbonate and bis(biphenyl) carbonate, and an aliphatic carbonate diester, such as dimethyl carbonate, diethyl carbonate and dibutyl carbonate. Among these compounds, an aromatic carbonate diester, particularly an aromatic carbonate diester having from 13 to 25 carbon atoms, is preferably used, and diphenyl carbonate is further preferably used, from the standpoint of reactivity and cost.

The purification method of the carbonate diester used in the invention is not particularly limited, and preferably, one of combination of simple distillation, rectification and recrystallization may be used for purification.

The carbonate diester used in the invention has a content of an organic impurity detected by gas chromatography of 0.3% by mol or less, preferably 0.1% by mol or less, and further preferably 0.05% by mol or less, based on the total amount, and has a total content of Na, Fe and Ca detected by ICP optical emission spectrometry of 2 ppm by mass or less, and preferably 1 ppm by mass or less.

Examples of the known preparation process of a polycarbonate resin include a phosgene method, in which an alkali aqueous solution of a dihydroxy compound is mainly reacted with phosgene in the presence of an organic solvent, and a melt-polycondensation method, in which a dihydroxy compound and a carbonate diester are subjected to melt-polycondensation reaction in the presence of a transesterification catalyst under a high temperature and high vacuum condition. Among these, the melt-polycondensation method requires a high temperature and high vacuum condition, but is economically advantageous over the phosgene method and provide advantageously a polycarbonate resin containing substantially no chlorine atom.

In melt-polycondensation in the preparation process of a polycarbonate of the invention, the carbonate diester is preferably used in an amount of from 0.90 to 1.30 mol, and more preferably from 0.99 to 1.05 mol, per 1 mol of the total diol component including the anhydrosugar alcohol represented by the formula (1) and the diol component represented by the formula (3). In the case where the raw material is in the form of a composition with a stabilizer or the like, the relationship in molar amounts shown above is preferably satisfied based on the net amounts of the components, such as the anhydrosugar alcohol.

In the invention, it is preferred that a nitrogen-containing basic compound is used as a polycondensation catalyst, and it is more preferred that a metallic compound catalyst described later is used in combination therewith. Examples of the nitrogen-containing basic compound include an ammonium hydroxide compound having an alkyl, aryl or alkylaryl group, such as tetramethylammonium hydroxide ($Me_4NOH$ or TMAH), tetraethylammonium hydroxide ($Et_4NOH$), tetrabutylammonium hydroxide ($Bu_4NOH$), benzyltrimethylammonium hydroxide ($\phi$-$CH_2(Me)_3NOH$) and hexadecyltrimethylammonium hydroxide, a tertiary amine compound, such as triethylamine, tributylamine, dimethybenzylamine and hexadecyldimethylamine, and a basic salt, such as tetramethylammonium borohydride ($Me_4NBH_4$), tetrabutylammonium borohydride ($Bu_4NBH_4$), tetramethylammonium tetraphenylborate ($Me_4NBPh_4$) and tetrabutylammonium tetraphenylborate ($Bu_4NBPh_4$), and among these, tetramethylammonium hydroxide is particularly preferably used.

The addition amount of the nitrogen-containing basic compound is such that the amount of basic nitrogen atom is preferably from $1×10^{-5}$ to $1×10^{-3}$ mol, and more preferably from $2×10^{-5}$ to $8×10^{-4}$ mol, per 1 mol of the total diol component.

In the case where the amount of the nitrogen-containing basic compound is less than the aforementioned range, it is not preferred since not only the rate of the polycondensation reaction is low in the initial stage to deteriorate the production efficiency, but also the reaction system receives thermal history for a longer period of time to cause coloration of the resulting polymer. In the case where the amount of the nitrogen-containing basic compound exceeds the aforementioned range, it is not preferred since bubbles are vigorously formed during the polycondensation reaction in the initial stage, and the balance of the monomers in the reaction system is disrupted due to volatilization of the monomer and oligomer components in the reaction system associated to the formation of bubbles, thereby failing to increase the polymerization degree to an intended level.

In the preparation process of the invention, a metallic compound catalyst is preferably used. Examples of the metallic compound catalyst include compounds having catalytic capability in transesterification reaction or esterification reaction, such as an alkoxide compound or a phenoxide compound of an alkali metal, an alkoxide compound or a phenoxide compound of an alkaline earth metal, a nitrogen-containing basic compound, a quaternary ammonium salt, an organic acid salt of an alkali metal or an alkaline earth metal, an acidic or neutral boron compound other than those described above, an aluminum compound, a zinc compound, a boron compound, a silicon compound, a titanium compound, an organotin compound, a lead compound an osmium compound, an antimony compound, a zirconium compound and a manganese compound. The using amount and preferred examples of the metallic compound catalyst will be described in detail later.

In the preparation process of the invention, preferably in the presence of a polymerization catalyst, the anhydrosugar alcohol composition, the glycol compound and the carbonate diester as raw materials are heated under ordinary pressure for preliminary reaction, and then agitated under heating to a temperature of 280° C. or less under reduced pressure with a phenol compound, such as phenol, and an aliphatic alcohol formed being distilled off. The reaction system is preferably maintained in an atmosphere of an inert gas, such as nitrogen, that is inert to the raw materials and the reaction mixture. Examples of the inert gas other than nitrogen include argon.

In the initial stage of the reaction, the reaction is preferably effected by heating under ordinary pressure. This is because the polymerization degree is prevented from being lowered due to disruption of the balance of the molar ratio of the monomers, which is caused by distillation of the unreacted monomers when the oligomerization is proceeded and the phenol compound or the aliphatic alcohol are distilled off under reduced pressure in the later stage of the reaction. In the preparation process of the invention, the reaction may be effected by removing appropriately the phenol compound or the aliphatic alcohol from the reaction system (reaction vessel). It is effective therefor to reduce the pressure of the system after progress of the oligomerization to a certain extent.

In the preparation process of the invention, the reaction is preferably carried out at a temperature as low as possible for suppressing decomposition of the anhydrosugar alcohol to provide a resin with less coloration and high viscosity, but for effecting the polymerization reaction appropriately, the polymerization temperature is preferably in a range of from 180 to 280° C., and more preferably, the maximum polymerization temperature is in a range of from 230 to 270° C.

The polycarbonate obtained by the preparation process of the invention has a lower limit of a specific viscosity ($\eta_{sp}$) of 0.20 or more, and preferably 0.22 or more, measured at 20° C. as a solution having 0.7 g of the polycarbonate dissolved in 100 mL of methylene chloride, and an upper limit thereof of 0.45 or less, preferably 0.37 or less, and more preferably 0.34 or less. In the case where the specific viscosity is lower than 0.20, it is difficult to impart a sufficient mechanical strength to a molded article obtained with the polycarbonate of the invention. In the case where the specific viscosity exceeds 0.45, it is not preferred since the melt flowability is deteriorated, and the melt temperature that provides flowability necessary for molding exceeds the decomposition temperature.

The specific viscosity ($\eta_{sp}$) can be converted from a viscosity measured with another solvent system, and for example, can be converted by the following expression from a reduced viscosity ($\eta_{sp/c}$) obtained by measuring a viscosity of a solution obtained by dissolving 120 mg of the polycarbonate in 10 mL of a mixed solvent of phenol and tetrachloroethane (50/50 by volume) with an Ubbelohde viscometer at 35° C.

$$\eta_{sp}=0.3443\times\eta_{sp/c}+0.0701$$

The polymerization degree of the polycarbonate of the invention is generally from 10 to 10,000, preferably from 30 to 5,000, and more preferably from 30 to 1,000.

The polycarbonate obtained by the preparation process of the invention preferably has a Col-b value, which shows the hue, of 5 or less, and preferably 3 or less.

The polycarbonate of the invention or the polycarbonate obtained by the preparation process of the invention can be used in various purposes including an optical medium field, an electric, electronic and office automation filed, an automobile and industrial machinery field, a medical and security field, a sheet, film and packaging field, and a sundry goods field. Specifically, examples of the optical medium field include DVD, CD-ROM, CD-R and a mini disk, examples of the electric, electronic and office automation filed include a mobile phone, a housing for a personal computer, a package of a battery, a member for a liquid crystal display and a connector, examples of the automobile and industrial machinery field include a headlight, an inner lens, a door handle, a bumper, a fender, a roof rail, an instrument panel, a cluster panel, a console box, a camera and a machine tool, examples of the medical and security field include an identification plate, a carport, a diffusion or reflection film for a liquid crystal display device and a drink water tank, and examples of the sundry goods field include a part for pachinko and a housing of a fire extinguisher.

Examples of a method for providing a molded article by molding the polycarbonate for the aforementioned purposes include injection molding, compression molding, injection and compression molding, extrusion molding and blow molding. Examples of a method for providing a film or a sheet therefrom include a solvent cast method, a melt extrusion method and a calendering method.

I. Inventions 1 and 2

In the inventions 1 and 2, an anhydrosugar alcohol composition containing 100 parts by mass of the anhydrosugar alcohol represented by the formula (1) and from 0.0005 to 0.5 part by mass of the cyclic phosphite compound represented by the formula (2) is used as a raw material of a polycarbonate. In the case where the addition amount of the cyclic phosphite compound is in the range, the anhydrosugar alcohol composition is improved in storage stability and can be stored for a prolonged period of time. The content of the cyclic phosphite compound per 100 parts by mass of the anhydrosugar alcohol represented by the formula (1) is preferably from 0.001 to 0.5 part by mass, and further preferably from 0.003 to 0.3 part by mass.

Specific examples of the cyclic phosphite compound represented by the formula (2) used in the inventions 1 and 2 include 6-[3-(3-t-butyl-4-hydroxy-5-methylphenyl)propoxy]-2,4,8,10-tetra-t-butyldibenz[d,f][1,3,2]dioxaphosphepine, 6-[3-(3,5-di-t-butyl-4-hydroxyphenyl)propoxy]-2,4,8,10-tetra-t-butyldibenz[d,f][1,3,2]dioxaphosphepine, 6-[3-(3,5-di-t-butyl-4-hydroxyphenyl)propoxy]-4,8-di-t-butyl-2,10-dimethyl-12H-dibenzo[d,g][1,3,2]dioxaphosphocine and 6-[3-(3,5-di-t-butyl-4-hydroxyphenyl)propionyloxy]-4,8-di-t-butyl-2,10-dimethyl-12H-dibenzo[d,g][1,3,2]dioxaphosphocine. Among these, preferred examples thereof include a compound represented by the formula (2), wherein $R^5$, $R^6$ and $R^8$ each represent a tertiary alkyl group having from 4 to 8 carbon atoms, $R^9$ represents an alkyl group having from 1 to 8 carbon atoms, X represents a single bond, A represents an alkylene group having from 2 to 8 carbon atoms, Y represents a hydroxyl group, and Z represents a hydrogen atom, and particularly preferred examples thereof include 6-[3-(3-t-butyl-4-hydroxy-5-methylphenyl)propoxy]-2,4,8,10-tetra-t-butyldibenz[d,f][1,3,2]dioxaphosphepine.

The cyclic phosphite compound in the inventions 1 and 2 may be those improved in hydrolysis resistance by adding an amine compound, an acid-bonded metallic salt or the like. Typical examples of the amine compound include a trialkanolamine compound, such as trimethanolamine, a dialkanolamine compound, such as diethanolamine, a monoalkanolamine compound, such as dibutylethanolamine, an aromatic amine compound, such as 1,3,5-trimethyl-2,4,6-triazine, an alkylamine compound, such as dibutylamine, a polyalkylenepolyamine compound, such as hexamethylenetetramine, and a hindered amine light stabilizer described later. Examples thereof further include a long-chain aliphatic amine disclosed in JP-A-61-63686, a compound containing a sterically hindered amine group disclosed in JP-A-6-329830, a hindered piperidinyl light stabilizer disclosed in JP-A-7-90270, and an organic amine disclosed in JP-A-7-278164. The content ratio of the amine compound with respect to the cyclic phosphite compound is generally about from 0.01 to 25% by mass.

In the inventions 1 and 2, at least one auxiliary stabilizer selected from a phosphorus stabilizer (except for those corresponding to the cyclic phosphite described above), a phenol stabilizer, a sulfur stabilizer and a hindered amine stabilizer may be used in addition to the cyclic phosphite described above. The addition amount of the auxiliary stabilizer is preferably from $2.5 \times 10^{-5}$ to 10 parts by mass, more preferably from $5 \times 10^{-5}$ to 5 parts by mass, and particularly preferably from $1 \times 10^{-4}$ to 2.5 parts by mass, per 100 parts by mass of the anhydrosugar alcohol represented by the formula (1).

As the phosphorus stabilizer used in the inventions 1 and 2, a phosphorus stabilizer containing a structure represented by the following formula (11) is preferred.

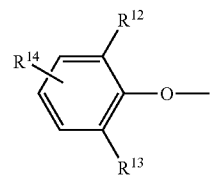

(11)

In the formula (11), $R^{12}$ and $R^{13}$ each represent a hydrogen atom or an alkyl group having from 1 to 10 carbon atoms, more preferably a hydrogen atom or an alkyl group having from 1 to 4 carbon atoms, and particularly preferably a hydrogen atom, a methyl group, an isopropyl group, an isobutyl group, a tert-butyl group or a tert-pentyl group.

$R^{14}$ represents at least one group selected from a hydrogen atom, an alkyl group having from 1 to 10 carbon atoms, an alkoxy group having from 1 to 10 carbon atoms, a cycloalkyl group having from 6 to 20 carbon atoms, a cycloalkoxy group having from 6 to 20 carbon atoms, an alkenyl group having from 2 to 10 carbon atoms, an aryl group having from 6 to 10 carbon atoms, an aryloxy group having from 6 to 10 carbon atoms, an aralkyl group having from 7 to 20 carbon atoms and an aralkyloxy group having from 7 to 20 carbon atoms, preferably a hydrogen atom, an alkyl group having from 1 to 10 carbon atoms or an aryl group having from 6 to 10 carbon atoms, and particularly preferably a hydrogen atom or an alkyl group having from 1 to 10 carbon atoms.

The phosphorus heat stabilizer used in the inventions 1 and 2 is preferably at least one compound selected from the group consisting of compounds represented by the following formulae (12), (13) and (14), wherein —$X^1$ represents the structure represented by the formula (11).

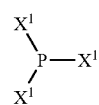

(12)

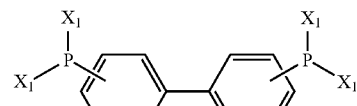

(13)

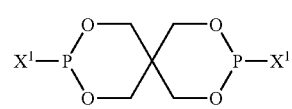

(14)

Specific preferred examples of the compound represented by the formula (12) include triphenyl phosphite, tris(2,4-di-tert-butylphenyl)phosphite and tris(nonylphenyl)phosphite, and tris(2,4-di-tert-butylphenyl)phosphite is particularly preferred.

Specific preferred examples of the compound represented by the formula (13) include tetrakis(2,4-di-tert-butylphenyl)-4,4'-biphenylene diphosphonite, tetrakis(2,6-di-tert-butylphenyl)-4,4'-biphenylene diphosphonite and tetrakis(2,6-di-tert-butylphenyl)-4,3'-biphenylene diphosphonite, and tetrakis(2,4-di-tert-butylphenyl)-4,4'-biphenylene diphosphonite is particularly preferred.

Specific preferred examples of the compound represented by the formula (14) include bis(2,4-di-tert-butylphenyl)pentaerythritol diphosphite and bis(2,6-di-tert-butyl-4-methylphenyl)-pentaerythritol diphosphite.

As the phosphorus stabilizer used in the inventions 1 and 2, a phosphorus stabilizer represented by the following formulae (15), (16) and (17) are also preferably used.

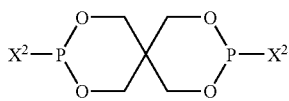
(15)

(16)

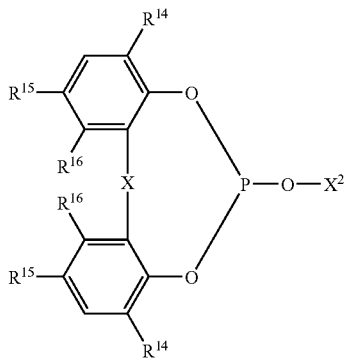
(17)

In the formulae (15), (16) and (17), $X^2$ represents an alkyl group having from 5 to 18 carbon atoms, preferably an alkyl group having from 8 to 18 carbon atoms, and particularly preferably an alkyl group having from 10 to 18 carbon atoms. In the formula (17), $R^{14}$ and $R^{15}$ each independently represent a hydrogen atom, an alkyl group having from 1 to 8 carbon atoms, a cycloalkyl group having from 5 to 8 carbon atoms, an alkylcycloalkyl group having from 6 to 12 carbon atoms, an aralkyl group having from 7 to 12 carbon atoms or a phenyl group, and $R^{16}$ represents a hydrogen atom or an alkyl group having from 1 to 8 carbon atoms. X represents a single bond, a sulfur atom or a —$CHR^{17}$— group (wherein $R^{17}$ represents a hydrogen atom, an alkyl group having from 1 to 8 carbon atoms or a cycloalkyl group having from 5 to 8 carbon atoms).

Specific examples of the compound represented by the formulae (15), (16) and (17) include distearylpentaerythritol diphosphite, diisodecylpentaerythritol diphosphite, tridecanyl phosphite, trilauryl phosphite, trioctadecyl phosphite, 2,2'-methylene-bis(4,6-di-t-butylphenyl)-2-ethylhexyl phosphite.

In addition to the compound represented by the formulae (12) to (17), such a phosphorus stabilizer may be used as 2,2'-ethylidene-bis(4,6-di-t-butylphenyl)fluorophosphite, 2-(2,4,6-tri-t-butylphenyl)-5-ethyl-5-butyl-1,3,2-oxaphosphorinane and 2,2',2"-nitrilo[triethyl-tris(3,3',5,5'-tetra-t-butyl-1,1'-biphenyl-2,2'-diyl)]phosphite.

The various phosphorus stabilizers described herein may be used solely or as a mixture of two or more kinds thereof.

The phenol stabilizer used in the inventions 1 and 2 is preferably a phenol stabilizer containing the structure represented by the following formula (18).

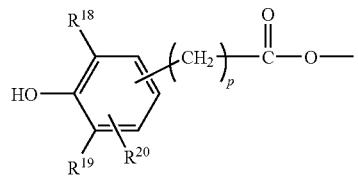
(18)

In the formula (18), $R^{18}$ represents a hydrogen atom or an alkyl group having from 1 to 10 carbon atoms, preferably a hydrogen atom or an alkyl group having from 1 to 4 carbon atoms, and particularly preferably a methyl group, an ethyl group, an isopropyl group, an isobutyl group or a tert-butyl group.

$R^{19}$ represents an alkyl group having from 4 to 10 carbon atoms, preferably an alkyl group having from 4 to 6 carbon atoms, and particularly preferably an isobutyl group, a tert-butyl group or a cyclohexyl group.

$R^{20}$ represents at least one group selected from the group consisting of a hydrogen atom, an alkyl group having from 1 to 10 carbon atoms, an alkoxy group having from 1 to 10 carbon atoms, a cycloalkyl group having from 6 to 20 carbon atoms, a cycloalkoxy group having from 6 to 20 carbon atoms, an alkenyl group having from 2 to 10 carbon atoms, an aryl group having from 6 to 10 carbon atoms, an aryloxy group having from 6 to 10 carbon atoms, an aralkyl group having from 7 to 20 carbon atoms and an aralkyloxy group having from 7 to 20 carbon atoms, preferably at least one group selected from the group consisting of a hydrogen atom, an alkyl group having from 1 to 10 carbon atoms, a cycloalkyl group having from 6 to 20 carbon atoms, an alkenyl group having from 2 to 10 carbon atoms, an aryl group having from 6 to 10 carbon atoms and an aralkyl group having from 7 to 20 carbon atoms, and particularly preferably a hydrogen atom or an alkyl group having from 1 to 10 carbon atoms. p represents an integer of from 1 to 4, preferably an integer of from 1 to 3, and particularly preferably 2.

The stabilizer having a hindered phenol moiety used in the inventions 1 and 2 is preferably at least one compound selected from the group consisting of compounds represented by the following formulae (19), (20) and (21), wherein —$X^3$ represents the structure represented by the formula (18).

$$X^3-R^{21} \quad (19)$$

$$\left[X^3-(CH_2)_m\right]_k-C-[R^{22}]_{4-k} \quad (20)$$

(21)

In the formula (19), $R^{21}$ represents a hydrocarbon group having from 8 to 30 carbon atoms, which may contain an oxygen atom, more preferably a hydrocarbon group having from 12 to carbon atoms, which may contain an oxygen atom, and particularly preferably a hydrocarbon group having from 15 to 25 carbon atoms, which may contain an oxygen atom.

In the formula (20), $R^{22}$ represents a hydrogen atom or an alkyl group having from 1 to 25 carbon atoms, more preferably a hydrogen atom or an alkyl group having from 1 to 18 carbon atoms, and particularly preferably an alkyl group having from 1 to 18 carbon atoms. m represents an integer of from 1 to 4, preferably an integer of from 1 to 3, and particularly preferably 2. k represents an integer of from 1 to 4, preferably an integer of from 3 to 4, and particularly preferably 4.

In the formula (21), $R^{23}$, $R^{24}$, $R^{25}$ and $R^{26}$ each independently represent a hydrogen atom or an alkyl group having from 1 to 4 carbon atoms, preferably an alkyl group having from 1 to 4 carbon atoms, and particularly preferably a methyl group. l represents an integer of from 1 to 4, preferably an integer of from 1 to 3, and particularly preferably 2.

Specific preferred examples of the compound represented by the formula (19) include octadecyl-3-(3,5-di-tert-butyl-4-hydroxyphenyl)propionate.

Specific preferred examples of the compound represented by the formula (20) include pentaerythritol tetrakis[3-3,5-di-tert-butyl-4-hydroxyphenyl]propionate].

Specific preferred examples of the compound represented by the formula (21) include 3,9-bis[2-[3-(3-tert-butyl-4-hydroxy-5-methylphenyl)-propionyloxy]-1,1-dimethylethyl]-2,4,8,10-tetraoxa-spiro[5,5]undecane.

As the phenol stabilizer used in the inventions 1 and 2, a phenol stabilizer containing a structure represented by the following formula (22) is preferred.

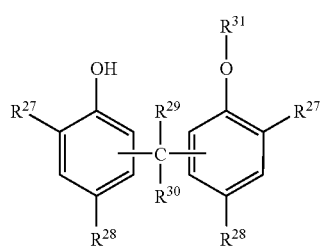

(22)

In the formula (22), $R^{27}$ represents an alkyl group having from 4 to 10 carbon atoms, preferably an alkyl group having from 4 to 6 carbon atoms, and particularly preferably an isobutyl group, a tert-butyl group, a tert-pentyl group or a cyclohexyl group.

$R^{28}$ represents an alkyl group having from 1 to 10 carbon atoms, preferably an alkyl group having from 1 to 4 carbon atoms, and particularly preferably a methyl group, an ethyl group, an isopropyl group, an isobutyl group or a tert-butyl group.

$R^{29}$ and $R^{39}$ each independently represent at least one group selected from the group consisting of a hydrogen atom, an alkyl group having from 1 to 10 carbon atoms, an alkenyl group having 2 to 10 carbon atoms, an aryl group having from 6 to 10 carbon atoms and an aralkyl group having from 7 to 20 carbon atoms, preferably a hydrogen atom, an alkyl group having from 1 to 10 carbon atoms or an aryl group having from 6 to 10 carbon atoms, and particularly preferably a hydrogen atom or an alkyl group having from 1 to 10 carbon atoms.

$R^{31}$ represents at least one group selected from the group consisting of a hydrogen atom, an alkyl group having from 1 to 10 carbon atoms, an alkenyl group having from 2 to 10 carbon atoms, an aryl group having from 6 to 10 carbon atoms, an aralkyl group having from 7 to 20 carbon atoms, an acryloyl group, which may have a substituent, and a methacryloyl group, which may have a substituent, preferably a hydrogen atom, an alkyl group having from 1 to 10 carbon atoms, an aralkyl group having from 7 to 20 carbon atoms, an acryloyl group, which may have a substituent, or an acryloyl group, which may have a substituent, and particularly preferably a hydrogen atom, an acryloyl group, which may have a substituent, or a methacryloyl group, which may have a substituent. Preferred examples of the substituent, which is substituted on the acryloyl group and the methacryloyl group, include an alkyl group having from 1 to 4 carbon atoms and an aralkyl group having from 7 to 10 carbon atoms.

Specific preferred examples of the phenol stabilizer containing the structure represented by the formula (22) include 2-tert-butyl-6-(3-tert-butyl-2-hydroxy-5-methylbenzyl)-4-methylphenyl acrylate and 2-[1-(2-hydroxy-3,5-di-tert-pentylphenyl)ethyl]-4,6-di-tert-pentylphenyl acrylate.

Examples of another phenol stabilizer include 2,6-di-t-butyl-4-methylphenol, a calcium salt of 3,5-di-t-butyl-4-hydroxybenzylphosphonic acid monoester, 3,9-bis[2-(3-(3-t-butyl-4-hydroxy-5-methylphenyl)-propionyloxy)-1,1-dimethylethyl]-2,4,8,10-tetraoxaspiro[5.5]undecane and N,N'-bis[3-(3',5'-di-t-butyl-4'-hydroxyphenyl)propionyl]-hexamethylenediamine.

The phenol stabilizer may be used solely or as a mixture of two or more kinds thereof.

Examples of the sulfur antioxidant include dilauryl-3,3'-thiodipropionate and neopentanetetrayltetrakis(3-laurylthiopropionate). Two or more kinds of these compounds may be used.

Preferred examples of the hindered amine light stabilizer include bis(2,2,6,6-tetramethyl-4-piperidyl)sebacate, bis(1,2,2,6,6-pentamethyl-4-piperidyl)2-(3,5-t-butyl-4-hydroxybenzyl)-2-butylmalonate, bis(2,2,6,6-tetramethyl-4-piperidyl)succinate, 2,2,6,6-tetramethyl-4-piperidyl methacrylate, tetrakis(2,2,6,6-tetramethyl-4-piperidyl)1,2,3,4-butanetetracarboxylate, a mixed ester of 1,2,3,4-butanetetracarboxylic acid with 1,2,2,6,6-pentamethyl-4-piperidinol and 1-tridecanol, a polycondensate of dimethylsuccinate and 1-(2-hydroxyethyl)-4-hydroxy-2,2,6,6-tetramethylpiperidine and poly[(6-(1,1,3,3-tetramethylbutyl)-1,3,5-triazin-2,4-diyl)((2,2,6,6-tetramethyl-4-piperidyl)imino)hexamethylene ((2,2,6,6-tetramethyl-4-piperidyl)imino)].

The anhydrosugar alcohol composition in the inventions 1 and 2 may further contain depending on necessity other additives, such as an ultraviolet ray absorbent, a light stabilizer other than hindered amine, a peroxide scavenger, a polyamide stabilizer, an excitation energy absorbent represented by an organic nickel complex, an ultraviolet ray shielding agent represented by carbon black and titanium oxide, a lead stabilizer, a tin stabilizer, a metallic soap stabilizer, a β-diketone compound stabilizing assistant, a hydroxylamine, a lubricant, a plasticizer, a flame retardant, a nucleating agent, a metal inactivating agent, an antistatic agent, a pigment, a filler, a pigment, an antiblocking agent, a surfactant, a processing assistant, a foaming agent, an emulsifier, a brightening agent, a neutralizing agent, e.g., calcium stearate, a coloration improving agent, e.g., 9,10-dihydro-9-oxa-10-phosphophenanthrene-10-oxide, and an auxiliary stabilizer, e.g., a benzofuran compound and an indoline compound disclosed in U.S. Pat. No. 4,325,853.

Examples of the ultraviolet ray absorbent include the following compounds.

Examples of a salicylate derivative include phenyl salicylate, 2-methyl-4,6-di-t-butylphenyl 3',5'-di-t-butyl-4'-hydroxybenzoate and a mixture thereof.

Examples of a 2-hydroxybenzophenone derivative include 2,4-dihydroxybenzophenone, bis(5-benzoyl-4-hydroxy-2-methoxyphenyl)methane, 2,2',4,4'-tetrahydroxybenzophenone and a mixture thereof.

Examples of a 2-(2'-hydroxyphenyl)benzotriazole compound include 2-(2-hydroxy-5-methylphenyl)benzotriazole, a condensate of poly(3-11)(ethylene glycol) and 2-[3'-t-butyl-2'-hydroxy-5'-(2-methoxycarbonylethyl)-phenyl]benzotriazole, 3-[3-t-butyl-5-(5-chloro-2H-benzotriazol-2-yl)-4-hydroxyphenyl]propionic acid and a mixture thereof.

Preferred examples of the ultraviolet ray absorbent include the following compounds, which may be used in combination of two or more kinds thereof.

Examples of a phenyl salicylate compound include 4-t-butylphenyl salicylate and 2-[2'-hydroxy-3',5'-bis($\alpha,\alpha$-dimethylbenzyl)phenyl]-2H-benzotriazole.

Examples of the light stabilizer other than hindered amine include the following compounds.

Examples of an acrylate light stabilizer include ethyl $\alpha$-cyano-$\beta,\beta$-diphenylacrylate, N-($\beta$-carbomethoxy-$\beta$-cyanovinyl)-2-methylindoline and a mixture thereof.

Examples of a nickel light stabilizer include a nickel complex of 2,2'-thiobis-[4-(1,1,3,3-tetramethylbutyl)phenol), a nickel complex of ketoxime and a mixture thereof.

Examples of an oxamide light stabilizer include 4,4'-dioctyloxyoxanilide, 2-ethoxy-5,4'-di-t-butyl-2'-ethyloxanilide and a mixture thereof.

Examples of a 2-(2-hydroxyphenyl)-1,3,5-triazine light stabilizer include 2,4,6-tris(2-hydroxy-4-octyloxyphenyl)-1,3,5-triazine, 2-[2-hydroxy-4-(2-hydroxy-3-octyloxypropoxy)phenyl]-4,6-bis(2,4-dimethylphenyl)-1,3,5-triazine and a mixture thereof.

Examples of the metal inactivating agent include N,N'-diphenyloxamide, N,N'-bis(salicyloyl)thiopropionylhydrazide and a mixture thereof.

Examples of the peroxide scavenger include an ester of $\beta$-thiodipropionic acid, mercaptobenzoimidazole, pentaerythritol tetrakis($\beta$-dodecylmercapto)propionate and a mixture thereof. Examples of the polyamide stabilizer include a copper or divalent manganese salt of an iodide or a phosphorus compound, and a mixture thereof. Examples of the hydroxylamine include N,N-dibenzylhydroxylamine, N-heptadecyl-N-octadecylhydroxiamine and a mixture thereof.

Examples of the neutralizing agent include calcium stearate, hydrotalcite (basic magnesium aluminum hydroxycarbonate hydrate), calcium oxide, polyurethane and a mixture thereof.

Examples of a lubricant include an aliphatic hydrocarbon, such as paraffin and wax, a higher fatty acid having from 8 to 22 carbon atoms, a metallic salt (such as Al, Ca, Mg and Zn) of a higher fatty acid having from 8 to 22 carbon atoms, an aliphatic alcohol having from 8 to 22 carbon atoms, polyglycol, an ester of a higher fatty acid having from 4 to 22 carbon atoms and an aliphatic monohydric alcohol having from 4 to 18 carbon atoms, a higher fatty acid amide having from 8 to 22 carbon atoms, a silicone oil and a rosin derivative.

The anhydrosugar alcohol composition used in the inventions 1 and 2 can be produced by mixing the cyclic phosphite compound represented by the formula (2) and the other additives used depending on necessity, or the cyclic phosphite compound represented by the formula (2), at least one stabilizing assistant selected from the phosphorus stabilizer, a phenol stabilizer, a sulfur stabilizer and a hindered amine stabilizer, and the other additives used depending on necessity. Upon mixing, any known method and apparatus may be used for forming a homogeneous mixture.

The anhydrosugar alcohol composition used in the inventions 1 and 2 can be produced by mixing the anhydrosugar alcohol represented by the formula (1) with the cyclic phosphite compound represented by the formula (2) in the production step or the purification step of the anhydrosugar alcohol, or any arbitrary step thereafter. The state of the anhydrosugar alcohol, the cyclic phosphite compound, the stabilizing assistant and the various additives may be any of a solid, a molten liquid and a solution.

It has been known that the anhydrosugar alcohol represented by the formula (1) forms formic acid through decomposition and denaturation, and the stability of the anhydrosugar alcohol and the anhydrosugar alcohol composition can be evaluated in such manner that the anhydrosugar alcohol or the composition thereof is stored under a prescribed condition and sampled from the start of storing, and aqueous solutions of the samples are monitored for change in pH with the lapse of time.

The anhydrosugar alcohol or the composition thereof having pH of 5 or more measured by the aforementioned method suffers substantially no decomposition and is favorably used as a raw material of a polymer, and the pH is more preferably 6 or more. There is substantially no case where the pH of the aqueous solution of the sample of the anhydrosugar alcohol or the composition thereof measured by the aforementioned method exceeds 9 unless a basic substance is added. In the case where the pH of the anhydrosugar alcohol composition having been stored in the air at 50° C. for 100 hours is in the aforementioned range, it can be understood that the composition has sufficient stability upon storing an ordinary condition, i.e., a condition around room temperature. In the case where the pH of the aqueous solution of the sample of the anhydrosugar alcohol or the composition thereof is lower than the range, it is not preferred since the polycondensation reaction upon using the anhydrosugar alcohol composition as a raw material of a polymer slowly proceeds to bring about such problems that the polymerization degree of the polymer fails to reach an intended value, and the hue of the polymer is deteriorated.

The inventions 1 and 2 are the preparation process of a polycarbonate represented by the formula (5) by melt-polycondensation of the anhydrosugar alcohol containing 100 parts by mass of the anhydrosugar alcohol represented by the formula (1) and from 0.0005 to 0.5 part by mass of the cyclic phosphite compound represented by the formula (2), the diol (glycol compound) represented by the formula (3) and the carbonate diester represented by the formula (4).

In the preparation process of the inventions 1 and 2, it is important to effect the melt-polycondensation in the presence of a metallic element selected from the following (a) and (b) as a polycondensation catalyst:

(a) one or more kind of a metallic element selected from an alkali metal, magnesium, calcium and strontium in an amount of from 1.2 to 40 µmol per 1 mol of the total diol component including the anhydrosugar alcohol represented by the formula (1) and the diol represented by the formula (3) and from 0.015 to 3.0 mol per 1 mol of the cyclic phosphite compound represented by the formula (2), and (b) a barium element in an amount of from 1.2 to 40 µmol per 1 mol of the total diol component including the anhydrosugar alcohol represented by the formula (1) and the diol represented by the formula (3) and from 0.005 to 3.0 mol per 1 mol of the cyclic phosphite compound represented by the formula (2), and one or more kind of a metallic element selected from an alkali metal, magnesium, calcium and strontium in an amount of 40 µmol or less in terms of the total amount with the barium element per 1 mol of anhydrosugar alcohol represented by the formula (1) and 3 mol or less in terms of a total amount with the barium element per 1 mol of the cyclic phosphite compound represented by the formula (2).

In the case where the amount of the metallic element is less than the aforementioned ranges, it is not preferred since the polymerization degree of the resulting polymer is not increased. In the case where the amount of the metallic element exceeds the aforementioned ranges, on the other hand, it is not preferred since not only the resulting polymer is significantly colored, but also the resulting polymer is deteriorated in melt stability in the molding step of the polymer and the kneading step thereof with the various additive, such as the various stabilizers. The barium element suffers considerably low decrease in catalytic activity in the presence of the cyclic phosphite compound, as compared to the other alkaline earth metal elements and alkali metal elements, and is advantageously used, for example, upon effecting polycondensation reaction using such an anhydrosugar alcohol composition that contains a relatively large amount of the cyclic phosphite compound for enhancing the stability of the anhydrosugar alcohol. The other alkaline earth metal elements and alkali metal elements than the barium element may be used in combination in an amount in the aforementioned ranges. The use of the barium element for the polycondensation reaction provides such an advantage that the amount of the diol represented by the formula (3) consumed through side reaction is small.

In the condition (a), the amount of the one or more kind of a metallic element selected from an alkali metal, magnesium, calcium and strontium per 1 mol of the total diol component including the anhydrosugar alcohol represented by the formula (1) and the dial represented by the formula (3) is preferably from 1.2 to 30 μmol, more preferably from 1.2 to 20 μmol, further preferably from 1.2 to 10 μmol, and still further preferably from 3 to 10 μmol.

In the condition (a), the amount of the one or more kind of a metallic element selected from an alkali metal, magnesium, calcium and strontium per 1 mol of the cyclic phosphite compound represented by the formula (2) is preferably from 0.02 to 3.0 mol, and more preferably from 0.02 to 1 mol.

In the condition (b), the amount of the barium element per 1 mol of the total diol component including the anhydrosugar alcohol represented by the formula (1) and the diol represented by the formula (3) is preferably from 1.2 to 30 μmol, more preferably from 1.2 to 20 μmol, and further preferably from 1.5 to 10 μmol, and the amount of the one or more kind of a metallic element selected from an alkali metal, magnesium, calcium and strontium in terms of the total amount with the barium element is preferably 30 μmol or less, more preferably 20 μmol or less, and particularly preferably 10 μmol or less.

In the condition (b), the amount of the barium element per 1 mol of the cyclic phosphite compound represented by the formula (2) is preferably 0.005 to 2.0 mol, and more preferably from 0.01 to 1 mol, and the amount of the one or more kind of a metallic element selected from an alkali metal, magnesium, calcium and strontium in terms of the total amount with the barium is preferably 2 mol or less, and more preferably 1 mol or less.

In the inventions 1 and 2, the nitrogen-containing basic compound is preferably used in combination as a polycondensation catalyst.

In the invention, the melt-polycondensation is effected in the presence of the nitrogen-containing basic compound and the alkali metal element and/or the alkaline earth metal element, and these substances may be present in the reaction system at the time when the reaction is started or during the reaction, or may be contained in advance in the diol or the carbonate diester used as raw materials.

In the case where the alkali metal element and/or the alkaline earth metal element is contained in the reaction system, a hydroxide, an inorganic salt, such as a carbonate salt and a hydorgencarbonate salt, an alkoxide compound, a phenoxide compound, an organic acid salt, a boron-containing compound or the like thereof may be added to the reaction system, and among these, a hydroxide, a carbonate salt, a hydrogencarbonate salt, a methoxide, a phenoxide, a 2,2-bis(4-hydroxyphenyl)propionate salt and an acetate salt thereof are particularly preferred from the standpoint of the reactivity, influence on the quality of the molded article finally obtained, cost and sanitary property.

In the case where the alkali metal element and/or the alkaline earth metal element is contained in advance in the raw materials, it may be contained in the diol or may be contained in the carbonate diester. In the case where the alkali metal element and/or the alkaline earth metal element is contained in the diol or the carbonate diester, it may be added in any step of the production step, the purification step and the like thereof. For example, in the case where the diol containing the alkali metal element and/or the alkaline earth metal element is used, a diol often contains a reducing agent, an antioxidant, a deoxidizing agent, a light stabilizer, an antacid agent, a metal inactivating agent and the like containing an alkali metal or an alkaline earth metal for enhancing the storage stability thereof, and therefore, such a diol may be used that contains at least one selected from the additives in an amount within the ranges of the metal element per 1 mol of the anhydrosugar alcohol and per 1 mol of the cyclic phosphite compound. Among these, sodium borohydride, sodium hydroxide, potassium hydroxide, sodium carbonate, potassium carbonate, sodium metaborate, disodium phosphate and the like are particularly preferred from the standpoint of enhancing effect of storage stability of the diol and cost.

In addition to the above, it has been known that an aluminum compound, a zinc compound, a silicon compound, a titanium compound, a tin compound, a lead compound, an osmium compound, an antimony compound, a zirconium compound, a manganese compound and the like have catalytic capability in transesterification reaction or esterification reaction as a polycondensation catalyst for producing a polycarbonate. In the inventions 1 and 2, these compounds may be used in combination with the alkali metal compound and the alkaline earth metal compound, but when the compounds are used in too large an amount, there may arise an adverse affect on the reactivity and the quality of the molded article and a problem on sanitary property. In particular, the polycarbonate represented by the formula (5) that is prepared by using a tin compound or a zinc compound as a polycondensation catalyst tends to be deteriorated in hue and thermal stability.

In the inventions 1 and 2, n in the formula (5) is a ratio of the molar number of the repeating units derived from the anhydrosugar alcohol represented by the formula (1) with respect to the molar number of the repeating units derived from the total diol component in the polymer chain, and is 1 or $0.6 \leq n \leq 0.9$. Accordingly, n−1 is a ratio of the molar number of the repeating units derived from the diol component represented by the formula (3) with respect to the molar number of the repeating units derived from the total diol component in the polymer chain.

In the case where n in the formula (5) is less than 0.6, it is not preferred since the resulting resin has a low glass transition temperature and is deteriorated in heat resistance. In the case where n exceeds 0.9, there are some cases where the resin has high melt flowability to fail to ensure flowability necessary for molding. In the case of n=1, i.e., in the case where the entire repeating units of the total diol component in the polymer chain are formed only with the repeating units derived from the anhydrosugar alcohol represented by the formula (1), it may be preferred in some cases since the number of kinds of the raw materials used is small, and a polymer having a high glass transition temperature can be obtained, although there may be the aforementioned difficulty in molding.

II. Inventions 3 to 7

In the inventions 3 to 7, a polycarbonate containing a plant-derived component represented by the formula (6) is prepared by melt-polycondensing the anhydrosugar alcohol represented by the formula (1) and the carbonate diester represented by the formula (4).

The polymerization degree of the polycarbonate of the invention, i.e., s in the formula (6), is generally from 10 to 10,000, preferably from 30 to 5,000, and more preferably from 30 to 1,000.

A polycondensation catalyst is necessarily used on melt-polycondensation, and in the inventions 3 to 7, it is important to effect melt-polycondensation in the presence of the nitrogen-containing basic compound in an amount of from 50 to 500 and preferably from 100 to 500 and an alkali metal element and an alkaline earth metal element in a total amount of from 1.2 to 40 μmmol, preferably from 1.2 to 30 and more preferably from 1.2 to 20 and particularly preferably from 1.2 to 10 per 1 mol of the anhydrosugar alcohol represented by the formula (1).

The nitrogen-containing basic compound is particularly preferably tetramethylammonium hydroxide.

In the case where the total amount of the alkali metal element and the alkaline earth metal element is less than the aforementioned range, it is not preferred since the polymerization degree of the resulting polymer is not sufficiently increased. In the case where the total amount exceeds the range, on the other hand, it is not preferred since not only the resulting polymer is significantly colored, but also the resulting polymer is deteriorated in melt stability in the molding step of the polymer and the kneading step thereof with the various additive, such as the various stabilizers.

The kinds of the alkali metal element and the alkaline earth metal element are not particularly limited, and from the standpoint of the cost, activity as a polymerization catalyst and influence on decomposition and coloration of the resulting polymer, preferred examples thereof include lithium, sodium, potassium, cesium, calcium and barium, which may be used solely or in combination of two or more kinds thereof.

In the invention, melt-polycondensation is effected in the presence of the nitrogen-containing basic compound and the alkali metal element and/or the alkaline earth metal element, and these substances may be present in the reaction system at the time when the reaction is started or during the reaction, or may be contained in advance in the diol or the carbonate diester used as raw materials.

For example, in the case where the alkali metal element and/or the alkaline earth metal element is contained in the reaction system, a hydroxide, an inorganic salt, such as a carbonate salt and a hydorgencarbonate salt, an alkoxide compound, a phenoxide compound, an organic acid salt, a boron-containing compound or the like thereof may be added to the reaction system, and among these, a hydroxide, a carbonate salt, a hydrogencarbonate salt, a methoxide, a phenoxide, a 2,2-bis(4-hydroxyphenyl)propionate salt and an acetate salt thereof are particularly preferred from the standpoint of the reactivity, influence on the quality of the molded article finally obtained, cost and sanitary property.

In the case where the alkali metal element and/or the alkaline earth metal element is contained in advance in the raw materials, it may be contained in the diol or may be contained in the carbonate diester. In the case where the alkali metal element and/or the alkaline earth metal element is contained in the diol or the carbonate diester, it may be added in any step of the production step, the purification step and the like thereof. For example, in the case where the diol containing the alkali metal element and/or the alkaline earth metal element is used, a diol often contains a reducing agent, an antioxidant, a deoxidizing agent, a light stabilizer, an antacid agent, a metal inactivating agent and the like containing an alkali metal or an alkaline earth metal for enhancing the storage stability thereof, and therefore, such a diol containing at least one selected from the additives may be used. Among these, sodium borohydride, sodium hydroxide, potassium hydroxide, sodium carbonate, potassium carbonate, sodium metaborate, disodium phosphate and the like are particularly preferred from the standpoint of enhancing effect of storage stability of the diol and cost.

III. Inventions 8 and 9

The polycarbonate obtained by the preparation process of the inventions 8 and 9 is represented by the formula (7), and the molar ratio of the repeating unit derived from the anhydrosugar alcohol represented by the formula (1) in the entire repeating units of the total diol component (i.e., t in the formula (7)) is in a range of from 0.4 to 1. In the case where t is less than the range, it is not preferred since the resulting resin has a low glass transition temperature to deteriorate the heat resistance thereof. In the case where t=1, i.e., the entire diol component is the component derived from the anhydrosugar alcohol, there are some cases where it is difficult to produce and mold a polymer having a high polymerization degree due to the high melt viscosity thereof. The ratio t is more preferably in a range of from 0.6 to 0.9, and particularly preferably in a range of from 0.65 to 0.85.

In the invention, a barium compound is used as a polycondensation catalyst. As compared to the case using an ordinary sodium compound, the use of a barium compound as a polycondensation catalyst provides such characteristics that a significantly high polymerization speed is obtained under the same polycondensation conditions, and the polycondensation catalyst is less influenced by an impurity or an additive that lowers the catalytic activity.

Examples of the barium compound include barium hydroxide, barium carbonate, barium hydrogencarbonate, barium acetate and barium stearate. Among these, a basic barium compound, such as barium hydroxide, barium carbonate and barium acetate, is preferably used from the standpoint of reactivity and cost, and furthermore, barium carbonate and barium acetate are particularly preferred since they are stable and is relatively safe even in contact with the human body owing to the weakly basic nature thereof.

The barium compound may be used solely or in combination of plural kinds thereof, and the barium compound may be used in combination with the aforementioned nitrogen-containing basic compound or a metallic compound other than the barium compound. Among these, the nitrogen-containing basic compound is more preferably used in combination, and tetramethylammonium hydroxide is particularly preferably used in combination.

The using amount of the barium compound as a polycondensation catalyst is preferably in a range of from $1 \times 10^{-7}$ to $1\times10^{-5}$ mol, and more preferably in a range of from $1\times10^{-7}$ to $5\times10^{-6}$ mol, in terms of barium element per 1 mol of the total diol component.

The polycarbonate prepared in the inventions 8 and 9 preferably has a total content of Na, Ca and Fe of 10 ppm by mass or less, more preferably 7 ppm by mass or less, and particularly preferably 3 ppm by mass or less. In the case where the total content of Na, Ca and Fe exceeds the range, it is not preferred since the polycarbonate suffers significant coloration and is deteriorated in melt stability and hydrolysis resistance. Na, Ca and Fe occupy the most amount of the inorganic impurities in the polymer because of such reasons that the polycarbonate is liable to be contaminated with Na, Ca and Fe from the materials of the production equipments or the outside air, and a commercially available product of the anhydrosugar alcohol represented by the formula (1) contains relatively large amounts of these elements. For making the total amount of Na, Ca and Fe in the aforementioned range, such measures may be employed as the use of raw materials having a small content of these elements, and the use of preparation equipments formed with a material that suffers less elution of the elements. The total content of Na, Ca and Fe in the polymer is preferably as small as possible, but for making the amount be 0 ppm by mass, there is a possibility of considerable increase in cost and deterioration in production efficiency for preventing contamination with these elements. Accordingly, the lower limit of the total content of Na, Ca and Fe that can be attained without deterioration in productivity is about 3 ppm by mass. The total content of Na, Ca and Fe in the polymer is preferably determined quantitatively by an ICP (induction coupled plasma) optical emission spectrometer or an ICP mass spectroscopy apparatus from the standpoint of accuracy and facility.

IV. Inventions 10 to 13

The polycarbonate of the inventions 10 and 11 has the structure represented by the formula (5), and a total content of F (fluorine), Cl (chlorine), Br (bromine) and I (iodine) (which may be hereinafter abbreviated as a halogen content) in the polymer of 2 ppm by mass or less, and preferably 1.5 ppm by mass of less. In the case where the total content of F, Cl, Br and I in the polymer exceeds the range, it is not preferred since the polymer suffers significant coloration and is deteriorated in melt stability and/or hydrolysis resistance. In particular, Cl is liable to be contained as an impurity in the polymer as compared to the other halogen elements since Cl has a large natural abundance, and compounds containing Cl are used for various purposes.

In the polycarbonate of the inventions 10 and 11, n in the formula (5) is 1 or $0.6 \leqq n \leqq 0.9$. In the case where n is less than 0.6, it is not preferred since the resulting resin has a low glass transition temperature and is deteriorated in heat resistance. In the case where n exceeds 0.9, there are some cases where the resin has high melt flowability to fail to ensure flowability necessary for molding. The range of n in the formula (5) is more preferably $0.65 \leqq n \leqq 0.85$.

In the case of n=1, i.e., in the case where the entire repeating units of the total diol component in the molecular chain of the polymer represented by the formula (5) are formed only with the repeating units derived from the anhydrosugar alcohol represented by the formula (1), it may be preferred in some cases since the number of kinds of the raw materials used is small, and a polymer having a high glass transition temperature can be obtained, although there may be the aforementioned difficulty in molding.

The anhydrosugar alcohol represented by the formula (1) and the diol component represented by the formula (3) used in the invention 13 have a content of an organic impurity detected by gas chromatography of 0.3% by mass or less, preferably 0.1% by mass or less, and more preferably 0.05% by mass or less, and have a total content of F, Cl, Br and I detected by ion chromatography (IC) of 1.5 ppm by mass or less, and preferably 1 ppm by mass or less.

The carbonate diester represented by the formula (4) used in the invention 13 has a content of an organic impurity detected by gas chromatography of 0.3% by mass or less, preferably 0.1% by mass or less, and more preferably 0.05% by mass or less, and has a total content of F, Cl, Br and I detected by ion chromatography (IC) of 1.5 ppm by mass or less, and preferably 1 ppm by mass or less.

In the preparation process of the invention 13, various polycondensation catalysts described above are preferably used, and from the standpoint of reactivity, influence on the quality of the molded article, cost and sanitary property, (i) a nitrogen-containing basic compound, (ii) an alkali metal compound and (iii) an alkaline earth metal compound are preferred. These compounds may be used solely or in combination of two or more kinds thereof, and combination use of (i) and (ii), combination use of (i) and (iii), and combination use of (i), (ii) and (iii) are particularly preferred.

The nitrogen-containing basic compound (i) is preferably tetramethylammonium hydroxide, and the alkali metal compound (ii) is preferably a sodium salt, and particularly preferably disodium 2,2-bis(4-hydroxyphenyl)propionate.

The preferred using amount of the nitrogen-containing basic compound (i) as a polycondensation catalyst has been described above.

The total addition amount of the alkali metal compound (ii) and the alkaline earth metal compound (iii) as the catalyst is preferably in a range of from 0 to $1\times10^{-5}$ mol, and more preferably in a range of from 0 to $5\times10^{-6}$ mol, per 1 mol of the diol compound as a raw material.

EXAMPLE

The invention will be specifically described with reference to examples below, but the invention is not limited to the examples.

In the inventions 1 to 13, the hue of the polymer was confirmed according to JIS Z8722 (corresponding to ISO/DIS 7724-1:1997 (modified)) in such a manner that 0.935 g of the polymer was dissolved in 4 mL of methylene chloride to prepare a solution, which was then measured for a Col-b value with UV-VIS Recording Spectrophotometer (produced by Shimadzu Corporation) under conditions of a wavelength of from 780 to 380 nm, an illumination of C and a viewing field of 2°.

I. Examples Corresponding to Inventions 1 and 2

Unless otherwise indicated, isosorbide used in the examples was obtained by purifying a product available from Roquette Frères through distillation under reduced pressure to provide a purity of 99.9% by mol and a content of Na, Ca and Fe of less than 1 ppm by mass in total (measured by ICP optical emission spectrometry), and was stored in a light-shielded, dry and inert atmosphere at room temperature (10 to 35° C.). 1,3-Propanediol, 1,4-butanediol and 1,6-hexanediol used were available from Wako Pure Chemical Industries, Ltd. and had a purity of 99.9% by mol and a content of Na, Ca and Fe of less than 1 ppm by mass in total (measured by ICP optical emission spectrometry). Diphenyl carbonate used was available from Teijin Chemicals Ltd. and had a purity of 99.9% by mol and a content of Na, Ca and Fe of less than 1 ppm by mass in total (measuredly ICP optical emission spectrometry). Tetramethylammonium hydroxide, methylene chloride, barium hydroxide octahydrate and acetone used were available from Wako Pure Chemical Industries, Ltd. Disodium 2,2-bis(4-hydroxyphenyl)propionate was prepared from 2,2-bis(4-hydroxyphenyl)propane according to an ordinary method.

The stabilizer used was 6-[3-(3-t-butyl-4-hydroxy-5-methylphenyl)propoxy]-2,4,8,10-tetra-t-butylbenz[d,f][1,3,2]dioxaphosphepine (Smilizer GP, a trade name, available from Sumitomo Chemical Co., Ltd.) as the cyclic phosphite represented by the formula (2).

Analysis and evaluation were carried out in the following manners.

The amounts of various metals in isosorbide and diphenyl carbonate were quantitatively determined with an ICP optical emission spectrometer, VISTA MP-X (multiple type), available from Varian, Inc. (detection minimum: 0.1 ppm).

The stability of isosorbide and an isosorbide composition was evaluated by preparing a 40% by weight aqueous solution of a sample and measuring pH of the solution (with pH Meter Model B212, available from Horiba, Ltd.).

The specific viscosity of a polymer was obtained by measuring a viscosity at 20° C. a solution formed by dissolving 0.7 g of a polycarbonate in 100 mL of methylene chloride.

Example 1

100 g of isosorbide having been purified by distillation (Ca content: 0.1 ppm by mass (0.37 μmol per 1 mol of isosorbide and 0.26 μmol based on the total diol component under the polymerization condition shown below), other alkaline earth metals, magnesium and alkali metals were not detected) was dissolved in acetone to prepare 500 mL of a solution. An acetone solution of 6-[3-(3-t-butyl-4-hydroxy-5-methylphenyl)propoxy]-2,4,8,10-tetra-t-butylbenz[d,f][1,3,2]dioxaphosphepine as the cyclic phosphite stabilizer was added to the solution in an amount of 0.12 part by mass per 100 parts by mass of isosorbide (Ca amount derived from the total diol component under the polymerization condition shown below: 0.0014 mol per 1 mol of the cyclic phosphite stabilizer), and then acetone was distilled off. The resulting isosorbide composition was placed in a hot air dryer set at 50° C., and the time when the composition was placed was designated as a high-temperature retaining time of 0. After lapsing 100 hours, the composition was sampled and measured for pH (pH was 8). The resulting isosorbide composition having been treated at 50° C. for 100 hours was subjected to polycondensation reaction of polycarbonate in the following manner.

61.45 g (0.42 mol) of the isosorbide composition, 13.70 g (0.18 mol) of 1,3-propanediol and 128.53 g (0.6 mol) of diphenyl carbonate were placed in a three-neck flask, in which disodium 2,2-bis(4-hydroxyphenyl)propionate, as a polycondensation catalyst, in an amount of 0.5 mg ($1.8\times10^{-6}$ mol) corresponding to a sodium amount of 6.0 μmol per 1 mol of the total diol component and 0.032 mol per 1 mol of the cyclic phosphite stabilizer, and tetramethylammonium hydroxide (16.4 mg, $1.8\times10^{-4}$ mol) were added, and melted at 180° C. in a nitrogen atmosphere. The interior of the reaction vessel was depressurized to 100 mmHg (13.33 kPa) under stirring, and the reaction was effected for about 20 minutes with phenol generated being distilled off. After increasing the temperature to 200° C., the interior was depressurized to 30 mmHg (4.00 kPa) with phenol generated being distilled off, and then the temperature was increased to 260° C. Thereafter, the interior was further depressurized gradually, and the reaction was finally effected under a condition of 260° C. and 0.5 mmHg (0.067 kPa). This point in time was designated as zero, and after lapsing 60 minutes, the content was sampled and measured for specific viscosity and Col-b value. The results obtained are shown in Table 1.

Example 2

The same procedures as in Example 1 were carried out except that the addition amount of disodium 2,2-bis(4-hydroxyphenyl)propionate used in the polycondensation reaction was changed to 0.33 mg ($1.2\times10^{-6}$ mol) corresponding to a sodium amount of 4.0 μmol per 1 mol of the total diol component and 0.021 mol per 1 mol of the cyclic phosphite stabilizer. The results obtained are shown in Table 1.

Example 3

The same procedures as in Example 1 were carried out except that the addition amount of 6-[3-(3-t-butyl-4-hydroxy-5-methylphenyl)propoxy]-2,4,8,10-tetra-t-butyldibenz[d,f][1,3,2]dioxaphosphepine as the cyclic phosphite stabilizer was 0.0035 part by mass per 100 parts by mass of the isosorbide having been purified by distillation, and the addition amount of disodium 2,2-bis(4-hydroxyphenyl)propionate used as a catalyst in the polycondensation reaction was changed to 0.25 mg ($9.0\times10^{-7}$ mol) corresponding to a sodium amount of 3.0 μmol per 1 mol of the total diol component and 0.55 mol per 1 mol of the cyclic phosphite stabilizer. The results obtained are shown in Table 1.

Example 4

The same procedures as in Example 1 were carried out except that the catalyst in the polycondensation reaction was changed from disodium 2,2-bis(4-hydroxyphenyl)propionate to barium hydroxide octahydrate in an amount of 0.28 mg ($0.9\times10^{-6}$ mol) corresponding to a barium amount of 1.5 μmol per 1 mol of the total diol component and 0.0081 mol per 1 mol of the cyclic phosphite stabilizer. The results obtained are shown in Table 1.

Example 5

The same procedures as in Example 1 were carried out except that the catalyst in the polycondensation reaction was changed from disodium 2,2-bis(4-hydroxyphenyl)propionate to barium hydroxide octahydrate in an amount of 0.57 mg ($1.8\times10^{-6}$ mol) corresponding to a barium amount of 3.0 μmol per 1 mol of the total diol component and 0.016 mol per 1 mol of the cyclic phosphite stabilizer. The results obtained are shown in Table 1.

Example 6

The same procedures as in Example 2 were carried out except that 1,4-butanediol was used instead of 1,3-propanediol in the same molar amount. The results obtained are shown in Table 1.

Example 7

The same procedures as in Example 2 were carried out except that 1,6-hexanediol was used instead of 1,3-propanediol in the same molar amount. The results obtained are shown in Table 1.

Comparative Example 1

The same procedures as in Example 1 were carried out except that the addition amount of disodium 2,2-bis(4-hydroxyphenyl)propionate used as a catalyst in the polycondensation reaction was changed to 0.16 mg ($6.0 \times 10^{-7}$ mol) corresponding to a sodium amount of 2 μmol per 1 mol of the total diol component and 0.011 mol per 1 mol of the cyclic phosphite stabilizer. The results obtained are shown in Table 1.

TABLE 1

| | Glycol compound | Amount of metallic element per 1 mol of total diol component (μmol) | Amount of metallic element per 1 mol of cyclic phosphite (mol) | Polymer (polycarbonate) Specific viscosity (—) | Polymer (polycarbonate) Col-b value (—) |
|---|---|---|---|---|---|
| Example 1 | 1,3-PDO | Na: 6.0<br>Ca: 0.26<br>total: 6.26 | Na: 0.032<br>Ca: 0.0014<br>total: 0.0334 | 0.26 | 0.50 |
| Example 2 | 1,3-PDO | Na: 4.0<br>Ca: 0.26<br>total: 4.26 | Na: 0.021<br>Ca: 0.0014<br>total: 0.0224 | 0.24 | 0.84 |
| Example 3 | 1,3-PDO | Na: 3.0<br>Ca: 0.26<br>total: 3.26 | Na: 0.55<br>Ca: 0.048<br>total: 0.598 | 0.32 | 1.05 |
| Example 4 | 1,3-PDO | Ba: 1.5<br>Ca: 0.26<br>total: 1.76 | Ba: 0.0081<br>Ca: 0.0014<br>total: 0.0095 | 0.31 | 1.18 |
| Example 5 | 1,3-PDO | Ba: 3.0<br>Ca: 0.26<br>total: 3.26 | Ba: 0.016<br>Ca: 0.0014<br>total: 0.0174 | 0.37 | 1.16 |
| Example 6 | 1,4-BDO | Na: 4.0<br>Ca: 0.26<br>total: 4.26 | Na: 0.021<br>Ca: 0.0014<br>total: 0.0224 | 0.30 | 1.10 |
| Example 7 | 1,6-HDO | Na: 4.0<br>Ca: 0.26<br>total: 4.26 | Na: 0.021<br>Ca: 0.0014<br>total: 0.0224 | 0.31 | 0.60 |
| Comparative Example 1 | 1,3-PDO | Na: 2.0<br>Ca: 0.26<br>total: 2.26 | Na: 0.011<br>Ca: 0.0014<br>total: 0.0124 | 0.18 | 1.98 |

Example 8

100 g of isosorbide having been purified by distillation (Ca content: 0.1 ppm by mass (0.37 μmol per 1 mol of isosorbide), other alkaline earth metals, magnesium and alkali metals were not detected) was dissolved in acetone to prepare 500 mL of a solution. An acetone solution of 6-[3-(3-t-butyl-4-hydroxy-5-methylphenyl)propoxy]-2,4,8,10-tetra-t-butyldibenz[d,f][1,3,2]dioxaphosphepine as the cyclic phosphite stabilizer was added to the solution in an amount of 0.12 part by mass per 100 parts by mass of isosorbide (Ca amount derived from isosorbide: 0.0014 mol per 1 mol of the cyclic phosphite stabilizer), and then acetone was distilled off. The resulting isosorbide composition was placed in a hot air dryer set at 50° C., and the time when the composition was placed was designated as a high-temperature retaining time of 0. After lapsing 100 hours, the composition was sampled and measured for pH (pH was 8). The resulting isosorbide composition having been treated at 50° C. for 100 hours was subjected to polycondensation reaction of polycarbonate in the following manner.

87.78 g of the isosorbide composition (isosorbide: 0.6 mol) and 128.53 g (0.6 mol) of diphenyl carbonate were placed in a three-neck flask, in which as a polycondensation catalyst disodium 2,2-bis(4-hydroxyphenyl)propionate in an amount of 0.5 mg ($1.8 \times 10^{-6}$ mol) corresponding to a sodium amount of 6.0 μmol per 1 mol of isosorbide and 0.023 mol per 1 mol of the cyclic phosphite stabilizer and tetramethylammonium hydroxide in an amount of 16.4 mg ($1.8 \times 10^{-4}$ mol) were added, and melted at 180° C. in a nitrogen atmosphere. The interior of the reaction vessel was depressurized to 100 mmHg (13.33 kPa) under stirring, and the reaction was effected for about 20 minutes with phenol generated being distilled off. After increasing the temperature to 200° C., the interior was depressurized to 30 mmHg (4.00 kPa) with phenol generated being distilled off, and then the temperature was increased to 260° C. Thereafter, the interior was further depressurized gradually, and the reaction was finally effected under a condition of 260° C. and 0.5 mmHg (0.067 kPa). This point in time was designated as zero, and after lapsing 60 minutes, the content was sampled and measured for specific viscosity and Col-b value. The results obtained are shown in Table 2.

Example 9

The same procedures as in Example 8 were carried out except that the catalyst in the polycondensation reaction was changed from disodium 2,2-bis(4-hydroxyphenyl)propionate to barium hydroxide octahydrate in an amount of 0.284 mg ($0.9 \times 10^{-6}$ mol) corresponding to a barium amount of 1.5

µmol per 1 mol of the isosorbide and 0.0058 mol per 1 mol of the cyclic phosphite stabilizer. The results obtained are shown in Table 2.

Example 10

The same procedures as in Example 8 were carried out except that the catalyst in the polycondensation reaction was changed from disodium 2,2-bis(4-hydroxyphenyl)propionate to barium hydroxide octahydrate in an amount of 0.57 mg ($1.8 \times 10^{-6}$ mol) corresponding to a barium amount of 3.0 µmol per 1 mol of the isosorbide and 0.011 mol per 1 mol of the cyclic phosphite stabilizer. The results obtained are shown in Table 2.

Example 11

The same procedures as in Example 8 were carried out except that the addition amount of 6-[3-(3-t-butyl-4-hydroxy-5-methylphenyl)propoxy]-2,4,8,10-tetra-t-butyldibenz[d,f][1,3,2]dioxaphosphepine as the cyclic phosphite stabilizer was 0.0035 part by mass per 100 parts by mass of the isosorbide having been purified by distillation (Ca amount derived from isosorbide: 0.0471 mol per 1 mol of the cyclic phosphite stabilizer), and the addition amount of disodium 2,2-bis(4-hydroxyphenyl)propionate used as a catalyst in the polycondensation reaction was changed to 0.25 mg ($9.0 \times 10^{-7}$ mol) corresponding to a sodium amount of 3.0 µmol per 1 mol of the isosorbide and 0.011 mol per 1 mol of the cyclic phosphite stabilizer. The results obtained are shown in Table 2.

Comparative Example 2

The same procedures as in Example 8 were carried out except that the addition amount of disodium 2,2-bis(4-hydroxyphenyl)propionate used as a catalyst in the polycondensation reaction was changed to 0.25 mg ($9.0 \times 10^{-7}$ mol) corresponding to a sodium amount of 3.0 µmol per 1 mol of the isosorbide and 0.011 mol per 1 mol of the cyclic phosphite stabilizer. The results obtained are shown in Table 2.

TABLE 2

| | | Amount of metallic element per 1 mol of isosorbide (µmol) | | Amount of metallic element per 1 mol of cyclic phosphite (mol) | Polymer (polycarbonate) Specific viscosity (—) | Col-b value (—) |
|---|---|---|---|---|---|---|
| Example 8 | Na: | 6.0 | Na: | 0.023 | 0.32 | 1.68 |
| | Ca: | 0.37 | Ca: | 0.0014 | | |
| | total: | 6.37 | total: | 0.0244 | | |
| Example 9 | Ba: | 1.5 | Ba: | 0.0058 | 0.31 | 1.18 |
| | Ca: | 0.37 | Ca: | 0.0014 | | |
| | total: | 1.87 | total: | 0.0072 | | |
| Example 10 | Ba: | 3.0 | Ba: | 0.011 | 0.37 | 1.16 |
| | Ca: | 0.37 | Ca: | 0.0014 | | |
| | total: | 3.37 | total: | 0.0124 | | |
| Example 11 | Na: | 3.0 | Na: | 0.3875 | 0.30 | 1.23 |
| | Ca: | 0.37 | Ca: | 0.0471 | | |
| | total: | 3.37 | total: | 0.4346 | | |
| Comparative Example 2 | Na: | 3.0 | Na: | 0.011 | 0.18 | 1.98 |
| | Ca: | 0.37 | Ca: | 0.0014 | | |
| | total: | 3.37 | total: | 0.0124 | | |

II. Examples Corresponding to Inventions 3 to 7

In the examples, diphenyl carbonate used was available from Teijin Chemicals Ltd., and tetramethylammonium hydroxide, methylene chloride, barium hydroxide octahydrate and lithium hydroxide used were available from Wako Pure Chemical Industries, Ltd. Disodium 2,2-bis(4-hydroxyphenyl)propionate was prepared from 2,2-bis(4-hydroxyphenyl)propane according to an ordinary method. As for isosorbide as the diol component, one selected from five kinds of materials, which were different in content of an alkali metal and an alkaline earth metal, available from Roquette Frères (which were referred to as lot A to E, respectively) and a material (lot S) obtained by subjecting the lot D to simple distillation once was used. An alkali metal and alkaline earth metal component was not detected by ICP optical emission spectroscopy from the diphenyl carbonate and isosorbide of the lot S.

The specific viscosity of a polymer was obtained by measuring a viscosity at 20° C. a solution formed by dissolving 0.7 g of a polycarbonate in 100 mL of methylene chloride.

The amounts of various metals in isosorbide and diphenyl carbonate were quantitatively determined with an ICP optical emission spectrometer, VISTA MP-X (multiple type), available from Varian, Inc. (detection minimum: 0.1 ppm). The isosorbide was also calculated for the total amount (in terms of µmol) per 1 mol of the diol component (isosorbide) of the content of metals measured above and the content of the metals derived from the catalyst compound added.

Example 12

87.68 g (0.6 mol) of isosorbide of the lot S and 128.53 g (0.6 mol) of diphenyl carbonate were placed in a three-neck flask, in which as a polycondensation catalyst disodium 2,2-bis(4-hydroxyphenyl)propionate (0.12 mg, $4.5 \times 10^{-7}$ mol, sodium: 1.5 µmol/mol-isosorbide) and tetramethylammonium hydroxide (TMAH, 16.4 mg, $1.8 \times 10^{-4}$ mol, 300 µmol/mol-isosorbide) were added, and melted at 180° C. in a nitrogen atmosphere. The interior of the reaction vessel was depressurized to 100 mmHg (13.33 kPa) under stirring, and the reaction was effected for about 20 minutes with phenol generated being distilled off. After increasing the temperature to 200° C., the interior was depressurized to 30 mmHg (4.00 kPa) with phenol generated being distilled off, and then the temperature was increased to 260° C. Thereafter, the interior was further depressurized gradually, and the reaction was finally effected under a condition of 260° C. and 0.5 mmHg (0.067 kPa). This point in time was designated as zero, and after lapsing 60 minutes, the content was sampled and measured for specific viscosity and Col-b value. The results obtained are shown in Table 3.

Examples 13 to 19 and Comparative Examples 3 to 5

The same procedures as in Example 12 were carried out except that the lot of isosorbide used, the amount of the nitrogen-containing basic compound, the catalyst compound and the amount of an alkali metal and an alkaline earth metal derived from the isosorbide used as a raw material were changed as shown in Table 3. The results obtained are shown in Table 3. As for the catalyst compound used, instead of disodium 2,2-bis(4-hydroxyphenyl)propionate, lithium hydroxide was used in Example 17, and barium hydroxide octahydrate was used in Example 18. No catalyst compound was added in Example 19.

TABLE 3

| | Lot of isosorbide used | Content of alkali metal and alkaline earth metal | | | | | | | Total metal amount per 1 mol of isosorbide (μmol/mol-isosorbide) | Amount of nitrogen-containing compound TMAH amount (μmol/mol-isosorbide) | Polymer (polycarbonate) | |
|---|---|---|---|---|---|---|---|---|---|---|---|---|
| | | Metal amount per 1 mol of isosorbide (μmol)* | | | | | | | | | Specific viscosity (—) | Col-b value (—) |
| | | Li | Na | K | Cs | Mg | Ca | Ba | | | | |
| Example 12 | S | 0 | 1.5 | 0 | 0 | 0 | 0 | 0 | 1.5 (Na: 1.5)* | 300 | 0.27 | 1.15 |
| Example 13 | S | 0 | 2.0 | 0 | 0 | 0 | 0 | 0 | 2.0 (Na: 2.0) | 200 | 0.27 | 1.10 |
| Example 14 | S | 0 | 3.0 | 0 | 0 | 0 | 0 | 0 | 3.0 (Na: 3.0) | 100 | 0.29 | 1.22 |
| Example 15 | A | 0 | 3.0 | 2.6 | 0 | 0 | 0.73 | 0 | 6.3 (Na: 0.5) | 100 | 0.31 | 1.12 |
| Example 16 | B | 0 | 1.8 | 0 | 0 | 0 | 0.37 | 0 | 2.2 (Na: 0.5) | 100 | 0.25 | 1.90 |
| Example 17 | S | 1.5 | 0 | 0 | 0 | 0 | 0 | 0 | 1.5 (Li: 1.5) | 300 | 0.30 | 0.87 |
| Example 18 | S | 0 | 0 | 0 | 0 | 0 | 0 | 1.5 | 1.5 (Ba: 1.5) | 300 | 0.24 | 0.90 |
| Example 19 | C | 0 | 8.9 | 0 | 0 | 0 | 0.58 | 0 | 9.5 (no catalyst added) | 100 | 0.26 | 3.80 |
| Comparative Example 3 | S | 0 | 1.0 | 0 | 0 | 0 | 0 | 0 | 1.0 (Na: 1.0) | 300 | 0.20 | — |
| Comparative Example 4 | S | 0 | 0.5 | 0 | 0 | 0 | 0 | 0 | 0.5 (Na: 0.5) | 500 | 0.18 | — |
| Comparative Example 5 | D | 0 | 79 | 3.0 | 0 | 0 | 0.37 | 0 | 85 (Na: 0.5) | 100 | 0.47 | 8.44 |

*The numeral in parentheses is a metal element amount derived from the catalyst compound within the total metal amount (μmol/mol-isosorbide).

III. Examples Corresponding to Inventions 8 and 9

In the examples, isosorbide used was available from Roquette Frères or Sanko Chemical Industry Co., Ltd., diphenyl carbonate used was available from Teijin Chemicals Ltd., and tetramethylammonium hydroxide, 1,3-propanediol (1,3-PDO), phenol, tetrachloroethane, barium hydroxide octahydrate and barium carbonate used were available from Wako Pure Chemical Industries, Ltd. Disodium 2,2-bis(4-hydroxyphenyl)propionate was prepared from 2,2-bis(4-hydroxyphenyl)propane according to an ordinary method.

In the examples, the specific viscosity of a polycarbonate resin and a molded article was obtained in the following manner. A reduced viscosity ($\eta_{sp/c}$) (dL/g) was obtained by measuring a viscosity of a solution, which was formed by dissolving 120 mg of a polycarbonate resin composition in 10 mL of a mixed solvent of phenol and tetrachloroethane (50/50 by volume), with an Ubbelohde viscometer at 35° C., and the reduced viscosity was converted to the specific viscosity by the following expression, wherein $\eta_{sp}$ is the specific viscosity obtained by measuring a solution formed by dissolving 0.7 g of a polycarbonate in 100 mL of methylene chloride at 20° C.

$$\eta_{sp} = 0.3443 \times \eta_{sp/c} + 0.0701$$

The content of Na, Ca and Fe in isosorbide as a raw material and a polycarbonate resin composition was measured in the following manner. A sample was precisely weighed on a platinum dish and asked with concentrated sulfuric acid. The resulting ash content was fused with potassium hydrogensulfate and dissolved in diluted nitric acid, and the solution was subjected to ICP optical emission spectroscopy with VISTA MP-X (multiple type), available from Varian, Inc.

Example 20

Isosorbide (manufactured by Roquette) having been subjected to simple distillation once (61.38 g, 0.42 mol), 1,3-propanediol (14.38 g, 0.19 mol) and diphenyl carbonate (128.53 g, 0.6 mol) were placed in a three-neck flask, in which as a polycondensation catalyst barium carbonate (0.0592 mg, $3 \times 10^{-7}$ mol) and tetramethylammonium hydroxide (5.47 mg, $6.0 \times 10^{-5}$ mol) were added, and melted at 180° C. in a nitrogen atmosphere. The interior of the reaction vessel was depressurized to 100 mmHg (13.33 kPa) under stirring, and the reaction was effected for about 20 minutes with phenol generated being distilled off. After increasing the temperature to 200° C., the interior was depressurized to 30 mmHg (4.00 kPa) with phenol generated being distilled off. The interior was further depressurized and the temperature was further increased, whereby the reaction was finally effected under a condition of 250° C. and 0.8 mmHg (0.11 kPa). The time when the condition reached 250° C. and 0.8 mmHg (0.11 kPa) was designated as zero, and after lapsing 10 minutes, the content was sampled and measured for various properties. The results obtained are shown in Table 4.

Example 21

The same procedures as in Example 1 were carried out except that the polycondensation catalyst was changed from barium carbonate to barium hydroxide octahydrate (0.0946 mg, $3 \times 10^{-7}$ mol). The results obtained are shown in Table 4.

Comparative Example 6

The same procedures as in Example 20 were carried out except that isosorbide available from Roquette Frères was not purified by distillation, and the polycondensation catalyst was changed from barium carbonate to disodium 2,2-bis(4-hydroxyphenyl)propionate (0.04 mg, $1.5 \times 10^{-7}$ mol, abbreviated as BPA·2Na in Table 1). The results obtained are shown in Table 4.

Comparative Example 7

The same procedures as in Example 20 were carried out except that isosorbide available from Sanko Chemical Industry Co., Ltd. was used without pretreatment, such as purification by distillation, was used instead of isosorbide available from Roquette Frères having been subjected to simple distillation once, and the polycondensation catalyst was changed from barium carbonate to disodium 2,2-bis(4-hydroxyphenyl)propionate (0.04 mg, $1.5 \times 10^{-7}$ mol, abbreviated as BPA·2Na in Table 4). The results obtained are shown in Table 4.

Comparative Example 8

The same procedures as in Example 20 were carried out except that isosorbide available from Sanko Chemical Industry Co., Ltd. was used without pretreatment, such as purification by distillation, was used instead of isosorbide available from Roquette Frères having been subjected to simple distillation once, and the polycondensation catalyst was changed from barium carbonate to barium hydroxide octahydrate (0.0946 mg, $3 \times 10^{-7}$ mol). The results obtained are shown in Table 4.

TABLE 4

|  | Catalyst | Reduced viscosity (dL/g) | Specific viscosity | Total content of Na, Ca and Fe (ppm by mass)* | | Hue of polymer (polycarbonate) (Col-b) |
| --- | --- | --- | --- | --- | --- | --- |
|  |  |  |  | Isosorbide | Polymer (polycarbonate) |  |
| Example 20 | $BaCO_3$ | 0.65 | 0.29 | 0.3 | 4.6 | 0.62 |
| Example 21 | $Ba(OH)_2 \cdot 8H_2O$ | 0.60 | 0.28 | 0.3 | 4.6 | 0.38 |
| Comparative Example 6 | BPA•2Na | 0.37 | 0.20 | 10.8 | 11.3 | 7.93 |
| Comparative Example 7 | BPA•2Na | 0.38 | 0.20 | 60.0 | 61.5 | 42.49 |
| Comparative Example 8 | $Ba(OH)_2 \cdot 8H_2O$ | 0.48 | 0.24 | 60.0 | 61.5 | 40 |

*1,3-propanediol having a total content of Na, Ca and Fe of 0.8 ppm by mass was used in all Examples and Comparative Examples in this table.

IV. Examples Corresponding to Inventions 10 to 13

In the examples, isosorbide used was available from Roquette Frères or Sanko Chemical Industry Co., Ltd., diphenyl carbonate used was available from Teijin Chemicals Ltd., and 1,3-propanediol (1,3-PDO), 1,4-butanediol (1,4-BDO), 1,6-hexanediol (1,6-HDO), phenol and tetrachloroethane used were available from Wako Pure Chemical Industries, Ltd. Disodium 2,2-bis(4-hydroxyphenyl)propionate was prepared from 2,2-bis(4-hydroxyphenyl)propane according to an ordinary method.

The halogen content of the diol, the diphenyl carbonate and the polymer was measured in the following manner. A sample was treated in a combustion gas absorber (900° C. in an Ar—$O_2$ atmosphere), and a gas thus generated was absorbed with pure water and measured by ion chromatography (Model DX-500, available from Dionex Corporation).

The purity of the diol and diphenyl carbonate was measured by gas chromatography (Model GC-14B, available from Shimadzu Corporation). The measurement conditions were a column temperature of 220° C., an injection temperature of 280° C., a detection temperature of 280° C., carrier gas: He (120 kPa, 1.63 mL/min), split: 30.9 mL/min, purge: 30 mL/min, and make-up: ($N_2$: 40 mL/min, $H_2 \times$air: 70×70 kPa). A sample solution (5% acetone solution) was prepared, and 1 μL thereof was injected for measurement.

In the examples, the specific viscosity of a polycarbonate resin and a molded article was obtained in the following manner. A reduced viscosity ($\eta_{sp/c}$) (dL/g) was obtained by measuring a viscosity of a solution, which was formed by dissolving 120 mg of a polycarbonate resin composition in 10 mL of a mixed solvent of phenol and tetrachloroethane (50/50 by volume), with an Ubbelohde viscometer at 35° C., and the reduced viscosity was converted to the specific viscosity by the following expression, wherein $\eta_{sp}$ is the specific viscosity obtained by measuring a solution formed by dissolving 0.7 g of a polycarbonate in 100 mL of methylene chloride at 20° C.

$\eta_{sp} = 0.3443 \times \eta_{sp/c} + 0.0701$

A polycarbonate prepared through polycondensation reaction was molded with an injection molding machine (PS Type Injection Molding Machine, Model PS20, available from Nissei Plastic Industrial Co., Ltd.) to form a molded piece, which was visually evaluated for appearance and hue.

Example 22

Isosorbide (available from Roquette Frères) having been subjected to simple distillation once (23.38 g, 0.16 mol), 1,3-propanediol (3.043 g, 0.04 mol) and diphenyl carbonate (42.84 g, 0.2 mol) were placed in a three-neck flask, in which as a polycondensation catalyst disodium 2,2-bis(4-hydroxyphenyl)propionate (2.723 μg, $1.0 \times 10^{-8}$ mol) and tetramethylammonium hydroxide (0.3646 mg, $4.0 \times 10^{-6}$ mol) were added, and melted at 180° C. in a nitrogen atmosphere. The interior of the reaction vessel was depressurized to 100 mmHg (13.33 kPa) under stirring, and the reaction was effected for about 20 minutes with phenol generated being distilled off. After increasing the temperature to 200° C., the interior was depressurized to 30 mmHg (4.00 kPa) with phenol generated being distilled off, and the temperature was further increased to 215° C. Thereafter, the interior was further depressurized gradually, and the reaction was continued at 20 mmHg (2.67 kPa) for 10 minutes and at 10 mmHg (1.33 kPa) for 10 minutes. After increasing the temperature to 230° C., the interior was further depressurized and the temperature was further increased, and the reaction was finally effected under a condition of 250° C. and 0.5 mmHg (0.067 kPa). This point in time was designated as zero, and after lapsing 10 minutes, the content was sampled and measured for reduced viscosity and halogen content. A test piece having a thickness of 3 mm, a width of 12.5 mm and a length of 63 mm was molded with an injection molding machine at a cylinder temperature of 250° C. and a die temperature of 80° C., and the appearance thereof was visually observed. The results obtained are shown in Table 5.

Example 23

The same procedures as in Example 22 were carried out except that 1,4-butanediol was used instead of 1,3-propanediol in the same molar amount. The results obtained are shown in Table 5.

Example 24

The same procedures as in Example 22 were carried out except that 1,6-hexanediol was used instead of 1,3-propanediol in the same molar amount. The results obtained are shown in Table 5.

Comparative Example 9

The same procedures as in Example 22 were carried out except that isosorbide was not purified by distillation. The results obtained are shown in Table 5.

Comparative Example 10

The same procedures as in Example 22 were carried out except that isosorbide available from Sanko Chemical Industry Co., Ltd. was used without purification by distillation. The results obtained are shown in Table 5.

kPa) for 10 minutes and at 10 mmHg (1.33 kPa) for 10 minutes. After increasing the temperature to 260° C., the interior was further depressurized and the temperature was further increased, and the reaction was finally effected under a condition of 270° C. and 0.5 mmHg (0.067 kPa). This point in time was designated as zero, and after lapsing 60 minutes, the content was sampled and measured for reduced viscosity, halogen content and Col-b value. A test piece having a disk shape with a thickness of 2 mm and a diameter of 35 mm was molded with the resulting polycarbonate with an injection molding machine at a cylinder temperature of 230° C. and a

TABLE 5

| | Diol component | | | | | | Polymer (polycarbonate) | | | Molded |
| | Isosorbide | | Glycol | | Diphenyl carbonate | | | | | article |
| | Halogen content[1] (ppm by mass) | Purity[2] (% by mass) | Halogen content[1] (ppm by mass) | Purity[2] (% by mol) | Halogen content[1] (ppm by mass) | Purity[2] (% by mol) | Halogen content[1] (ppm by mass) | Reduced viscosity (dL/g) | Specific viscosity (—) | Hue (Col-b) | Appearance (visual observation) |
| --- | --- | --- | --- | --- | --- | --- | --- | --- | --- | --- | --- |
| Example 22 | Cl: 0.1<br>F: N.D.[3]<br>Br: N.D.<br>I: N.D. | 99.9 | Cl: N.D.<br>F: N.D.<br>Br: N.D.<br>I: N.D. | 1,3-PDO<br>99.9 | Cl: 0.4<br>F: N.D.<br>Br: N.D.<br>I: N.D. | 99.9 | Cl: 0.5<br>F: N.D.<br>Br: N.D.<br>I: N.D. | 0.57 | 0.27 | 0.51 | good |
| Example 23 | Cl: 0.8<br>F: N.D.<br>Br: N.D.<br>I: N.D. | 99.9 | Cl: N.D.<br>F: N.D.<br>Br: N.D.<br>I: N.D. | 1,4-BDO<br>99.9 | Cl: 0.4<br>F: N.D.<br>Br: N.D.<br>I: N.D. | 99.9 | Cl: 0.2<br>F: N.D.<br>Br: N.D.<br>I: N.D. | 0.76 | 0.33 | 0.96 | good |
| Example 24 | Cl: 0.8<br>F: N.D.<br>Br: N.D.<br>I: N.D. | 99.9 | Cl: N.D.<br>F: N.D.<br>Br: N.D.<br>I: N.D. | 1,6-HDO<br>99.9 | Cl: 0.4<br>F: N.D.<br>Br: N.D.<br>I: N.D. | 99.9 | Cl: 0.4<br>F: N.D.<br>Br: N.D.<br>I: N.D. | 0.71 | 0.31 | 1.12 | good |
| Comparative Example 9 | Cl: 1.7<br>F: N.D.<br>Br: N.D.<br>I: N.D. | 99.9 | Cl: N.D.<br>F: N.D.<br>Br: N.D.<br>I: N.D. | 1,3-PDO<br>99.9 | Cl: 0.4<br>F: N.D.<br>Br: N.D.<br>I: N.D. | 99.9 | Cl: 2.5<br>F: N.D.<br>Br: N.D.<br>I: N.D. | 0.33 | 0.18 | 7.76 | slightly yellowish |
| Comparative Example 10 | Cl: 36.0<br>F: N.D.<br>Br: N.D.<br>I: N.D. | 97.8 | Cl: N.D.<br>F: N.D.<br>Br: N.D.<br>I: N.D. | 1,3-PDO<br>99.9 | Cl: 0.4<br>F: N.D.<br>Br: N.D.<br>I: N.D. | 99.9 | Cl: 6.8<br>F: N.D.<br>Br: N.D.<br>I: N.D. | 0.28 | 0.17 | 41.94 | slightly yellowish |

[1] The halogen content was a measured value by ion chromatography.
[2] The purity was a measured value by gas chromatography.
[3] N.D.: not detected (detection minimum (0.1 ppm by mass) or lower)

Example 25

87.68 g of isosorbide having been subjected to simple distillation once (0.6 mol) and 128.53 g of diphenyl carbonate (0.6 mol) were placed in a three-neck flask, in which as a polycondensation catalyst disodium 2,2-bis(4-hydroxyphenyl)propionate (0.04 mg, $1.5 \times 10^{-7}$ mol) and tetramethylammonium hydroxide (5.5 mg, $6.0 \times 10^{-5}$ mol) were added, and melted at 180° C. in a nitrogen atmosphere. The interior of the reaction vessel was depressurized to 100 mmHg (13.33 kPa) under stirring, and the reaction was effected for about 20 minutes with phenol generated being distilled off. After increasing the temperature to 200° C., the interior was depressurized to 30 mmHg (4.00 kPa) with phenol generated being distilled off, and the temperature was further increased to 250° C. Thereafter, the interior was further depressurized gradually, and the reaction was continued at 20 mmHg (2.67 kPa) for 10 minutes and at 10 mmHg (1.33 kPa) for 10 minutes. After increasing the temperature to 260° C., the interior was further depressurized and the temperature was further increased, and the reaction was finally effected under a condition of 270° C. and 0.5 mmHg (0.067 kPa). This point in time was designated as zero, and after lapsing 60 minutes, the content was sampled and measured for reduced viscosity, halogen content and Col-b value. A test piece having a disk shape with a thickness of 2 mm and a diameter of 35 mm was molded with the resulting polycarbonate with an injection molding machine at a cylinder temperature of 230° C. and a die temperature of 80° C., and the appearance and hue thereof were visually observed. The results obtained are shown in Table 6.

Example 26

The same procedures as in Example 25 were carried out except that isosorbide having a total content of F, Cl, Br and I of 0.2 ppm by mass. The results obtained are shown in Table 6.

Comparative Example 11

The same procedures as in Example 25 were carried out except that isosorbide having a total content of F, Cl, Br and I of 1.7 ppm by mass was used in the reaction as it is without distillation purification. The results obtained are shown in Table 6.

TABLE 6

| | Isosorbide | | Diphenyl carbonate | | Polymer (polycarbonate) | | | Molded article |
|---|---|---|---|---|---|---|---|---|
| | Halogen content (ppm by mass) | Purity* (% by mol) | Halogen content (ppm by mass) | Purity* (% by mol) | Halogen content (ppm by mass) | Specific viscosity (—) | Hue (Col-b value) | Appearance (visual observation) |
| Example 25 | Cl: 0.8<br>F: N.D.**<br>Br: N.D.<br>I: N.D. | 99.9 | Cl: 0.4<br>F: N.D.<br>Br: N.D.<br>I: N.D. | 99.9 | Cl: 0.2<br>F: N.D.<br>Br: N.D.<br>I: N.D. | 0.31 | 1.1 | good |
| Example 26 | Cl: 0.2<br>F: N.D.<br>Br: N.D.<br>I: N.D. | 99.9 | Cl: 0.4<br>F: N.D.<br>Br: N.D.<br>I: N.D. | 99.9 | Cl: 0.4<br>F: N.D.<br>Br: N.D.<br>I: N.D. | 0.24 | 0.83 | good |
| Comparative Example 11 | Cl: 1.7<br>F: N.D.<br>Br: N.D.<br>I: N.D. | 99.9 | Cl: 0.4<br>F: N.D.<br>Br: N.D.<br>I: N.D. | 99.9 | Cl: 2.2<br>F: N.D.<br>Br: N.D.<br>I: N.D. | 0.31 | 8.9 | slightly yellowish |

*The purity is the value analyzed by gas chromatography
**N.D.: not detected (detection lower limit: 0.1 ppm by mass)

INDUSTRIAL APPLICABILITY

The polycarbonate obtained by the preparation process of the invention can be applied to such various purposes as an optical medium field, an electric, electronic and office automation filed, an automobile and industrial machinery field, a medical field, a security field, a sheet, film and packaging field, and a sundry goods field.

The invention claimed is:

1. A polycarbonate represented by the following formula (5) having a total content of F, Cl, Br and I in the polymer of 2 ppm by mass or less:

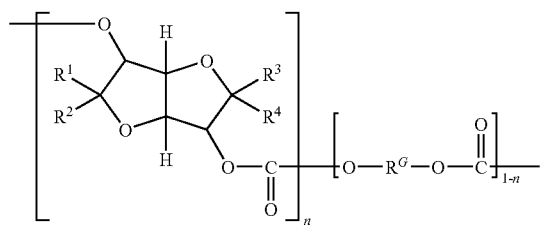

(5)

wherein $R^1$ to $R^4$ each independently represent a group selected from a hydrogen atom, an alkyl group, a cycloalkyl group and an aryl group; $R^G$ represents an aliphatic group having from 2 to 12 carbon atoms; and n represents 1 or $0.6 \leq n \leq 0.9$.

2. The polycarbonate as claimed in claim 1, wherein the polycarbonate has a Col-b value of 5 or less.

3. A molded article comprising the polycarbonate as claimed in claim 1.

4. A process for the preparation of the polycarbonate as claimed in claim 1, the process comprising a step of melt-polycondensing an anhydrosugar alcohol represented by the following formula (1) having a total content of F, Cl, Br and I of 1.5 ppm by mass or less and a purity of 99.7% by mol or more analyzed by gas chromatography:

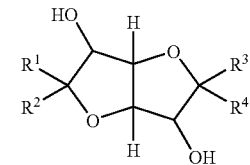

(1)

wherein $R^1$ to $R^4$ each independently represent a group selected from a hydrogen atom, an alkyl group, a cycloalkyl group and an aryl group, a diol represented by the following formula (3) having a total content of F, Cl, Br and I of 1.5 ppm by mass or less and a purity of 99.7% by mol or more analyzed by gas chromatography:

(3)

wherein $R^G$ represents an aliphatic group having from 2 to 12 carbon atoms, and a carbonate diester represented by the following formula (4) having a total content of F, Cl, Br and I of 1.5 ppm by mass or less and a purity of 99.7% by mol or more analyzed by gas chromatography:

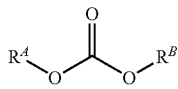

(4)

wherein $R^A$ and $R^B$ each represent a group selected from an alkyl group, a cycloalkyl group and an aryl group, provided that $R^A$ and $R^B$ may be the same as or different from each other.

5. A molded article comprising the polycarbonate as claimed in claim 2.

6. A process for the preparation of the polycarbonate as claimed in claim 2, the process comprising a step of melt-polycondensing an anhydrosugar alcohol represented by the following formula (1) having a total content of F, Cl, Br and I of 1.5 ppm by mass or less and a purity of 99.7% by mol or more analyzed by gas chromatography:

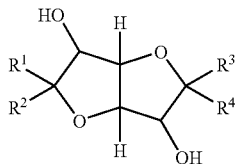
(1)

wherein $R^1$ to $R^4$ each independently represent a group selected from a hydrogen atom, an alkyl group, a cycloalkyl group and an aryl group, a diol represented by the following formula (3) having a total content of F, Cl, Br and I of 1.5 ppm by mass or less and a purity of 99.7% by mol or more analyzed by gas chromatography:

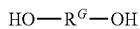
(3)

wherein $R^G$ represents an aliphatic group having from 2 to 12 carbon atoms, and a carbonate diester represented by the following formula (4) having a total content of F, Cl, Br and I of 1.5 ppm by mass or less and a purity of 99.7% by mol or more analyzed by gas chromatography:

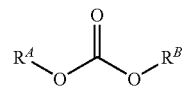
(4)

wherein $R^A$ and $R^B$ each represent a group selected from an alkyl group, a cycloalkyl group and an aryl group, provided that $R^A$ and $R^B$ may be the same as or different from each other.

* * * * *